US012804766B2

(12) United States Patent
Back et al.

(10) Patent No.: US 12,804,766 B2
(45) Date of Patent: Nov. 17, 2026

(54) OPERATING METHOD AND APPARATUS OF UE, RELATED TO SL DRX CONFIGURATION APPLICATION TIME IN SIDELINK DRX, IN WIRELESS COMMUNICATION SYSTEM

(71) Applicant: LG ELECTRONICS INC., Seoul (KR)

(72) Inventors: Seoyoung Back, Seoul (KR); Seungmin Lee, Seoul (KR); Giwon Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 202 days.

(21) Appl. No.: 18/847,152

(22) PCT Filed: Mar. 16, 2023

(86) PCT No.: PCT/KR2023/003529
§ 371 (c)(1),
(2) Date: Sep. 13, 2024

(87) PCT Pub. No.: WO2023/177236
PCT Pub. Date: Sep. 21, 2023

(65) Prior Publication Data

US 2025/0193966 A1 Jun. 12, 2025

Related U.S. Application Data

(60) Provisional application No. 63/333,202, filed on Apr. 21, 2022, provisional application No. 63/333,211,
(Continued)

(30) Foreign Application Priority Data

Mar. 16, 2022 (KR) ........................ 10-2022-0032849
Mar. 23, 2022 (KR) ........................ 10-2022-0036274

(51) Int. Cl.
*H04W 76/28* (2018.01)
*H04L 5/00* (2006.01)
*H04W 72/25* (2023.01)

(52) U.S. Cl.
CPC ........... *H04W 76/28* (2018.02); *H04L 5/0055* (2013.01); *H04W 72/25* (2023.01)

(58) Field of Classification Search
CPC ....... H04W 76/28; H04W 72/25; H04W 4/08; H04W 4/40; H04W 28/02; H04W 52/02;
(Continued)

(56) References Cited

U.S. PATENT DOCUMENTS

2020/0344722 A1 10/2020 He et al.
2021/0037468 A1 2/2021 Huang et al.
(Continued)

FOREIGN PATENT DOCUMENTS

WO 2021/138789 A1 7/2021

OTHER PUBLICATIONS

Xiaomi, "Discussion on sidelink DRX open issues", R2-2200791, 3GPP TSG-RAN WG2 Meeting #116b, Jan. 11, 2022.
(Continued)

*Primary Examiner* — Michael Y Mapa
(74) *Attorney, Agent, or Firm* — BRYAN CAVE LEIGHTON PAISNER LLP

(57) ABSTRACT

According to an embodiment, an operating method of a first user equipment (UE) related to sidelink discontinuous reception (SL DRX) in a wireless communication system, the method comprises: the first UE establishing a PC5 connection with a second UE; the first UE transmitting SL DRX configuration-related information to the second UE; and the first UE performing transmission on the basis of the SL DRX configuration after an SL DRX configuration application time of the second UE, wherein the SL DRX configuration
(Continued)

application time of the second UE is a time related to hybrid automatic repeat request acknowledgement (HARQ ACK) information transmission for a physical sidelink shared channel (PSSCH) including the SL DRX configuration.

14 Claims, 21 Drawing Sheets

Related U.S. Application Data filed on Apr. 21, 2022, provisional application No. 63/330,786, filed on Apr. 14, 2022, provisional application No. 63/326,896, filed on Apr. 3, 2022, provisional application No. 63/323,452, filed on Mar. 24, 2022.

(58) Field of Classification Search
CPC ..... H04W 72/04; H04W 72/20; H04W 76/14; H04W 92/18; H04L 5/0055
USPC .................. 370/252, 329; 455/7, 41.1–41.2, 455/450–452.2, 464, 509
See application file for complete search history.

(56) References Cited

U.S. PATENT DOCUMENTS

| | | | | |
|---|---|---|---|---|
| 2022/0272789 | A1* | 8/2022 | Wang | H04W 76/14 |
| 2023/0208563 | A1* | 6/2023 | Liang | H04L 1/1848<br>370/311 |
| 2023/0276364 | A1* | 8/2023 | Basu Mallick | H04L 1/1812<br>370/311 |

OTHER PUBLICATIONS

Intel Corporation, "Leftover aspects on SL DRX", R2-2200528, 3GPP TSG RAN WG2 Meeting #116b, Jan. 11, 2022.

* cited by examiner (a)

(b)

FIG. 12
PC5 RRC connection
UE
TX or RX
Peer UE
TX or RX

OPERATING METHOD AND APPARATUS OF UE, RELATED TO SL DRX CONFIGURATION APPLICATION TIME IN SIDELINK DRX, IN WIRELESS COMMUNICATION SYSTEM

CROSS-REFERENCE TO RELATED APPLICATIONS

This application is a National Phase application under 35 U.S.C. 371 of International Application No. PCT/KR2023/003529, filed on Mar. 16, 2023, which claims the benefit of Korean Application Nos. 10-2022-0032849, filed on Mar. 16, 2022 and 10-2022-0036274, filed on Mar. 23, 2022, and U.S. Provisional Application No. 63/323,452, filed on Mar. 24, 2022, 63/326,896, filed on Apr. 3, 2022, 63/330,786, filed on Apr. 14, 2022, 63/333,202, filed on Apr. 21, 2022 and 63/333,211, filed on Apr. 21, 2022, the contents of which are incorporated by reference herein in their entirety.

TECHNICAL FIELD

The following description relates to a wireless communication system, and more particularly, to a method and apparatus for operating a user equipment (UE) related to a time of applying a sidelink discontinuous reception (SL DRX) configuration in SL DRX.

BACKGROUND

Wireless communication systems are being widely deployed to provide various types of communication services such as voice and data. In general, a wireless communication system is a multiple access system capable of supporting communication with multiple users by sharing available system resources (bandwidth, transmission power, etc.). Examples of the multiple access system include a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system, and a multi carrier frequency division multiple access (MC-FDMA) system.

A wireless communication system uses various radio access technologies (RATs) such as long term evolution (LTE), LTE-advanced (LTE-A), and wireless fidelity (WiFi). 5th generation (5G) is such a wireless communication system. Three key requirement areas of 5G include (1) enhanced mobile broadband (eMBB), (2) massive machine type communication (mMTC), and (3) ultra-reliable and low latency communications (URLLC). Some use cases may require multiple dimensions for optimization, while others may focus only on one key performance indicator (KPI). 5G supports such diverse use cases in a flexible and reliable way.

eMBB goes far beyond basic mobile Internet access and covers rich interactive work, media and entertainment applications in the cloud or augmented reality (AR). Data is one of the key drivers for 5G and in the 5G era, we may for the first time see no dedicated voice service. In 5G, voice is expected to be handled as an application program, simply using data connectivity provided by a communication system. The main drivers for an increased traffic volume are the increase in the size of content and the number of applications requiring high data rates. Streaming services (audio and video), interactive video, and mobile Internet connectivity will continue to be used more broadly as more devices connect to the Internet. Many of these applications require always-on connectivity to push real time information and notifications to users. Cloud storage and applications are rapidly increasing for mobile communication platforms. This is applicable for both work and entertainment. Cloud storage is one particular use case driving the growth of uplink data rates. 5G will also be used for remote work in the cloud which, when done with tactile interfaces, requires much lower end-to-end latencies in order to maintain a good user experience. Entertainment, for example, cloud gaming and video streaming, is another key driver for the increasing need for mobile broadband capacity. Entertainment will be very essential on smart phones and tablets everywhere, including high mobility environments such as trains, cars and airplanes. Another use case is augmented reality (AR) for entertainment and information search, which requires very low latencies and significant instant data volumes.

One of the most expected 5G use cases is the functionality of actively connecting embedded sensors in every field, that is, mMTC. It is expected that there will be 20.4 billion potential Internet of things (IoT) devices by 2020. In industrial IoT, 5G is one of areas that play key roles in enabling smart city, asset tracking, smart utility, agriculture, and security infrastructure.

URLLC includes services which will transform industries with ultra-reliable/available, low latency links such as remote control of critical infrastructure and self-driving vehicles. The level of reliability and latency are vital to smart-grid control, industrial automation, robotics, drone control and coordination, and so on.

Now, multiple use cases will be described in detail.

5G may complement fiber-to-the home (FTTH) and cable-based broadband (or data-over-cable service interface specifications (DOCSIS)) as a means of providing streams at data rates of hundreds of megabits per second to giga bits per second. Such a high speed is required for TV broadcasts at or above a resolution of 4K (6K, 8K, and higher) as well as virtual reality (VR) and AR. VR and AR applications mostly include immersive sport games. A special network configuration may be required for a specific application program. For VR games, for example, game companies may have to integrate a core server with an edge network server of a network operator in order to minimize latency.

The automotive sector is expected to be a very important new driver for 5G, with many use cases for mobile communications for vehicles. For example, entertainment for passengers requires simultaneous high capacity and high mobility mobile broadband, because future users will expect to continue their good quality connection independent of their location and speed. Other use cases for the automotive sector are AR dashboards. These display overlay information on top of what a driver is seeing through the front window, identifying objects in the dark and telling the driver about the distances and movements of the objects. In the future, wireless modules will enable communication between vehicles themselves, information exchange between vehicles and supporting infrastructure and between vehicles and other connected devices (e.g., those carried by pedestrians). Safety systems may guide drivers on alternative courses of action to allow them to drive more safely and lower the risks of accidents. The next stage will be remote-controlled or self-driving vehicles. These require very reliable, very fast communication between different self-driving vehicles and between vehicles and infrastructure. In the future, self-driving vehicles will execute all driving activities, while drivers are focusing on traffic abnormality elusive to the vehicles themselves. The technical requirements for self-driving vehicles call for ultra-low latencies and ultra-high reliability, increasing traffic safety to levels humans cannot achieve.

Smart cities and smart homes, often referred to as smart society, will be embedded with dense wireless sensor networks. Distributed networks of intelligent sensors will identify conditions for cost- and energy-efficient maintenance of the city or home. A similar setup can be done for each home, where temperature sensors, window and heating controllers, burglar alarms, and home appliances are all connected wirelessly. Many of these sensors are typically characterized by low data rate, low power, and low cost, but for example, real time high definition (HD) video may be required in some types of devices for surveillance.

The consumption and distribution of energy, including heat or gas, is becoming highly decentralized, creating the need for automated control of a very distributed sensor network. A smart grid interconnects such sensors, using digital information and communications technology to gather and act on information. This information may include information about the behaviors of suppliers and consumers, allowing the smart grid to improve the efficiency, reliability, economics and sustainability of the production and distribution of fuels such as electricity in an automated fashion. A smart grid may be seen as another sensor network with low delays.

The health sector has many applications that may benefit from mobile communications. Communications systems enable telemedicine, which provides clinical health care at a distance. It helps eliminate distance barriers and may improve access to medical services that would often not be consistently available in distant rural communities. It is also used to save lives in critical care and emergency situations. Wireless sensor networks based on mobile communication may provide remote monitoring and sensors for parameters such as heart rate and blood pressure.

Wireless and mobile communications are becoming increasingly important for industrial applications. Wires are expensive to install and maintain, and the possibility of replacing cables with reconfigurable wireless links is a tempting opportunity for many industries. However, achieving this requires that the wireless connection works with a similar delay, reliability and capacity as cables and that its management is simplified. Low delays and very low error probabilities are new requirements that need to be addressed with 5G Finally, logistics and freight tracking are important use cases for mobile communications that enable the tracking of inventory and packages wherever they are by using location-based information systems. The logistics and freight tracking use cases typically require lower data rates but need wide coverage and reliable location information.

A wireless communication system is a multiple access system that supports communication of multiple users by sharing available system resources (a bandwidth, transmission power, etc.). Examples of multiple access systems include a CDMA system, an FDMA system, a TDMA system, an OFDMA system, an SC-FDMA system, and an MC-FDMA system.

Sidelink (SL) refers to a communication scheme in which a direct link is established between user equipments (UEs) and the UEs directly exchange voice or data without intervention of a base station (BS). SL is considered as a solution of relieving the BS of the constraint of rapidly growing data traffic.

Vehicle-to-everything (V2X) is a communication technology in which a vehicle exchanges information with another vehicle, a pedestrian, and infrastructure by wired/wireless communication. V2X may be categorized into four types: vehicle-to-vehicle (V2V), vehicle-to-infrastructure (V2I), vehicle-to-network (V2N), and vehicle-to-pedestrian (V2P). V2X communication may be provided via a PC5 interface and/or a Uu interface.

As more and more communication devices demand larger communication capacities, there is a need for enhanced mobile broadband communication relative to existing RATs. Accordingly, a communication system is under discussion, for which services or UEs sensitive to reliability and latency are considered. The next-generation RAT in which eMBB, MTC, and URLLC are considered is referred to as new RAT or NR. In NR, V2X communication may also be supported.

FIG. 1 is a diagram illustrating V2X communication based on pre-NR RAT and V2X communication based on NR in comparison.

For V2X communication, a technique of providing safety service based on V2X messages such as basic safety message (BSM), cooperative awareness message (CAM), and decentralized environmental notification message (DENM) was mainly discussed in the pre-NR RAT. The V2X message may include location information, dynamic information, and attribute information. For example, a UE may transmit a CAM of a periodic message type and/or a DENM of an event-triggered type to another UE.

For example, the CAM may include basic vehicle information including dynamic state information such as a direction and a speed, vehicle static data such as dimensions, an external lighting state, path details, and so on. For example, the UE may broadcast the CAM which may have a latency less than 100 ms. For example, when an unexpected incident occurs, such as breakage or an accident of a vehicle, the UE may generate the DENM and transmit the DENM to another UE. For example, all vehicles within the transmission range of the UE may receive the CAM and/or the DENM. In this case, the DENM may have priority over the CAM.

In relation to V2X communication, various V2X scenarios are presented in NR. For example, the V2X scenarios include vehicle platooning, advanced driving, extended sensors, and remote driving.

For example, vehicles may be dynamically grouped and travel together based on vehicle platooning. For example, to perform platoon operations based on vehicle platooning, the vehicles of the group may receive periodic data from a leading vehicle. For example, the vehicles of the group may widen or narrow their gaps based on the periodic data.

For example, a vehicle may be semi-automated or full-automated based on advanced driving. For example, each vehicle may adjust a trajectory or maneuvering based on data obtained from a nearby vehicle and/or a nearby logical entity. For example, each vehicle may also share a dividing intention with nearby vehicles.

Based on extended sensors, for example, raw or processed data obtained through local sensor or live video data may be exchanged between vehicles, logical entities, terminals of pedestrians and/or V2X application servers. Accordingly, a vehicle may perceive an advanced environment relative to an environment perceivable by its sensor.

Based on remote driving, for example, a remote driver or a V2X application may operate or control a remote vehicle on behalf of a person incapable of driving or in a dangerous environment. For example, when a path may be predicted as in public transportation, cloud computing-based driving may be used in operating or controlling the remote vehicle. For example, access to a cloud-based back-end service platform may also be used for remote driving.

A scheme of specifying service requirements for various V2X scenarios including vehicle platooning, advanced driving, extended sensors, and remote driving is under discussion in NR-based V2X communication.

DISCLOSURE

Technical Problem

An object of embodiment(s) is to provide an operation method of a user equipment (UE) related to a time of applying a sidelink discontinuous reception (SL DRX) configuration in SL DRX. Embodiment(s) discloses a method of processing data of services with different TX profiles but the same L2 ID when a TX UE performs GC transmission in GC.

Technical Solution

According to an embodiment of the present disclosure, an operating method of a first user equipment (UE) related to sidelink discontinuous reception (SL DRX) in a wireless communication system includes establishing a PC5 connection with a second UE by the first UE, transmitting information related to an SL DRX configuration to the second UE by the first UE, and performing transmission based on the SL DRX configuration from a time point of applying the SL DRX configuration of the second UE by the first UE, wherein the time point of applying the SL DRX configuration of the second UE is a time point related to transmission of hybrid automatic repeat request acknowledgement (HARQ ACK) information for a physical sidelink shared channel (PSSCH) including the SL DRX configuration.

According to an embodiment of the present disclosure, an operating method of a second user equipment (UE) related to sidelink discontinuous reception (SL DRX) in a wireless communication system includes establishing a PC5 connection with a first UE by the second UE, receiving information related to an SL DRX configuration from the first UE by the second UE, and receiving a packet of the first UE based on the SL DRX configuration from a time point of applying the SL DRX configuration by the second UE, wherein the time point of applying the SL DRX configuration of the second UE is a time point related to transmission of hybrid automatic repeat request acknowledgement (HARQ ACK) information for a physical sidelink shared channel (PSSCH) including the SL DRX configuration.

According to an embodiment of the present disclosure, a first user equipment (UE) in a wireless communication system includes at least one processor, and at least one computer memory operatively connected to the at least one processor and configured to store instructions that when executed cause the at least one processor to perform operations, wherein the operations include establishing a PC5 connection with a second UE, transmitting information related to an SL DRX configuration to the second UE, and performing transmission based on the SL DRX configuration from a time point of applying the SL DRX configuration of the second UE, and the time point of applying the SL DRX configuration of the second UE is a time point related to transmission of hybrid automatic repeat request acknowledgement (HARQ ACK) information for a physical sidelink shared channel (PSSCH) including the SL DRX configuration.

The time point related to transmission of the HARQ ACK information may include a time at which the HARQ ACK information is transmitted or a time at which HARQ ACK information, transmission of which is omitted, is determined to be transmitted.

The HARQ ACK information, transmission of which is omitted, may be omitted based on priorities of the sidelink and uplink signals.

The HARQ ACK information, transmission of which is omitted, may be omitted based on the priority related to PSFCH transmission and reception.

The time point related to transmission of the HARQ ACK information may be a time point after a predetermined offset value from the time point at which the HARQ ACK information is transmitted.

A default SL DRX configuration may be applied before the time point of applying the SL DRX configuration.

The first UE may communicate with at least one of another UE, a UE related to an autonomous driving vehicle, a base station (BS), or a network.

Advantageous Effects

According to an embodiment, a loss of transmission packets may be reduced during a sidelink discontinuous reception (SL DRX) operation between a TX UE and an RX UE.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION

In various embodiments of the present disclosure, "/" and "," should be interpreted as "and/or". For example, "A/B" may mean "A and/or B". Further, "A, B" may mean "A and/or B". Further, "A/B/C" may mean "at least one of A, B and/or C". Further, "A, B, C" may mean "at least one of A, B and/or C".

In various embodiments of the present disclosure, "or" should be interpreted as "and/or". For example, "A or B" may include "only A", "only B", and/or "both A and B". In other words, "or" should be interpreted as "additionally or alternatively".

Techniques described herein may be used in various wireless access systems such as code division multiple access (CDMA), frequency division multiple access (FDMA), time division multiple access (TDMA), orthogonal frequency division multiple access (OFDMA), single carrier-frequency division multiple access (SC-FDMA), and so on. CDMA may be implemented as a radio technology such as universal terrestrial radio access (UTRA) or CDMA2000. TDMA may be implemented as a radio technology such as global system for mobile communications (GSM)/general packet radio service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, evolved-UTRA (E-UTRA), or the like. IEEE 802.16m is an evolution of IEEE 802.16e, offering backward compatibility with an IRRR 802.16e-based system. UTRA is a part of universal mobile telecommunications system (UMTS). 3rd generation partnership project (3GPP) long term evolution (LTE) is a part of evolved UMTS (E-UMTS) using evolved UTRA (E-UTRA). 3GPP LTE employs OFDMA for downlink (DL) and SC-FDMA for uplink (UL). LTE-advanced (LTE-A) is an evolution of 3GPP LTE.

A successor to LTE-A, 5th generation (5G) new radio access technology (NR) is a new clean-state mobile communication system characterized by high performance, low latency, and high availability. 5G NR may use all available spectral resources including a low frequency band below 1 GHz, an intermediate frequency band between 1 GHz and 10 GHz, and a high frequency (millimeter) band of 24 GHz or above.

While the following description is given mainly in the context of LTE-A or 5G NR for the clarity of description, the technical idea of an embodiment of the present disclosure is not limited thereto.

Figure 1:
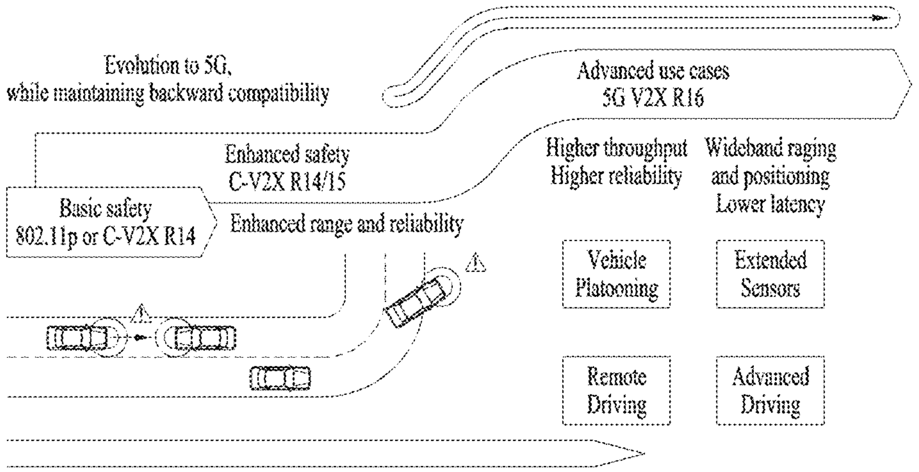
FIG. 1 is a diagram for explaining comparison between vehicle-to-everything (V2X) communication based on pre-new radio (NR) radio access technology (RAT) and V2X communication based on NR.
Figure 2:
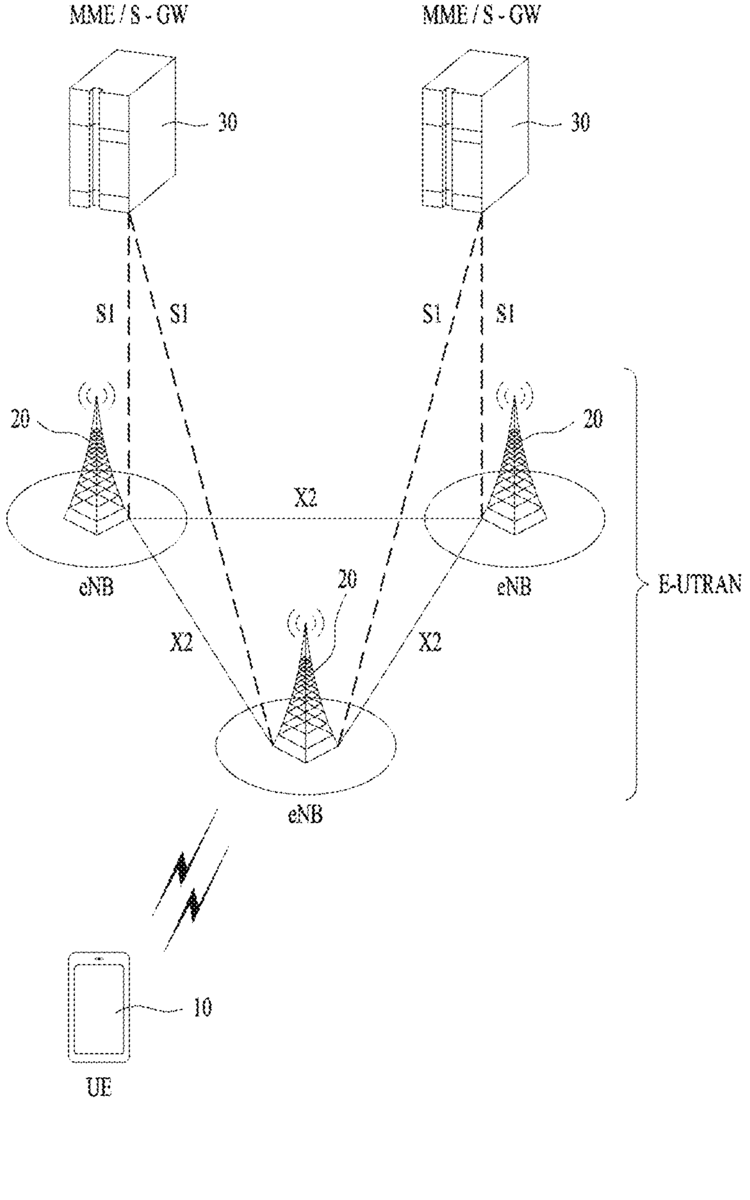
FIG. 2 illustrates the structure of a Long Term Evolution (LTE) system according to an embodiment of the present disclosure.

FIG. 2 illustrates the structure of an LTE system according to an embodiment of the present disclosure. This may also be called an evolved UMTS terrestrial radio access network (E-UTRAN) or LTE/LTE-A system.

Referring to FIG. 2, the E-UTRAN includes evolved Node Bs (eNBs) 20 which provide a control plane and a user plane to UEs 10. A UE 10 may be fixed or mobile, and may also be referred to as a mobile station (MS), user terminal (UT), subscriber station (SS), mobile terminal (MT), or wireless device. An eNB 20 is a fixed station communication with the UE 10 and may also be referred to as a base station (BS), a base transceiver system (BTS), or an access point.

eNBs 20 may be connected to each other via an X2 interface. An eNB 20 is connected to an evolved packet core (EPC) 39 via an S1 interface. More specifically, the eNB 20 is connected to a mobility management entity (MME) via an S1-MME interface and to a serving gateway (S-GW) via an S1-U interface.

The EPC 30 includes an MME, an S-GW, and a packet data network-gateway (P-GW). The MME has access information or capability information about UEs, which are mainly used for mobility management of the UEs. The S-GW is a gateway having the E-UTRAN as an end point, and the P-GW is a gateway having a packet data network (PDN) as an end point.

Based on the lowest three layers of the open system interconnection (OSI) reference model known in communication systems, the radio protocol stack between a UE and a network may be divided into Layer 1 (L1), Layer 2 (L2) and Layer 3 (L3). These layers are defined in pairs between a UE and an Evolved UTRAN (E-UTRAN), for data transmission via the Uu interface. The physical (PHY) layer at L1 provides an information transfer service on physical channels. The radio resource control (RRC) layer at L3 functions to control radio resources between the UE and the network. For this purpose, the RRC layer exchanges RRC messages between the UE and an eNB.

Figure 3:
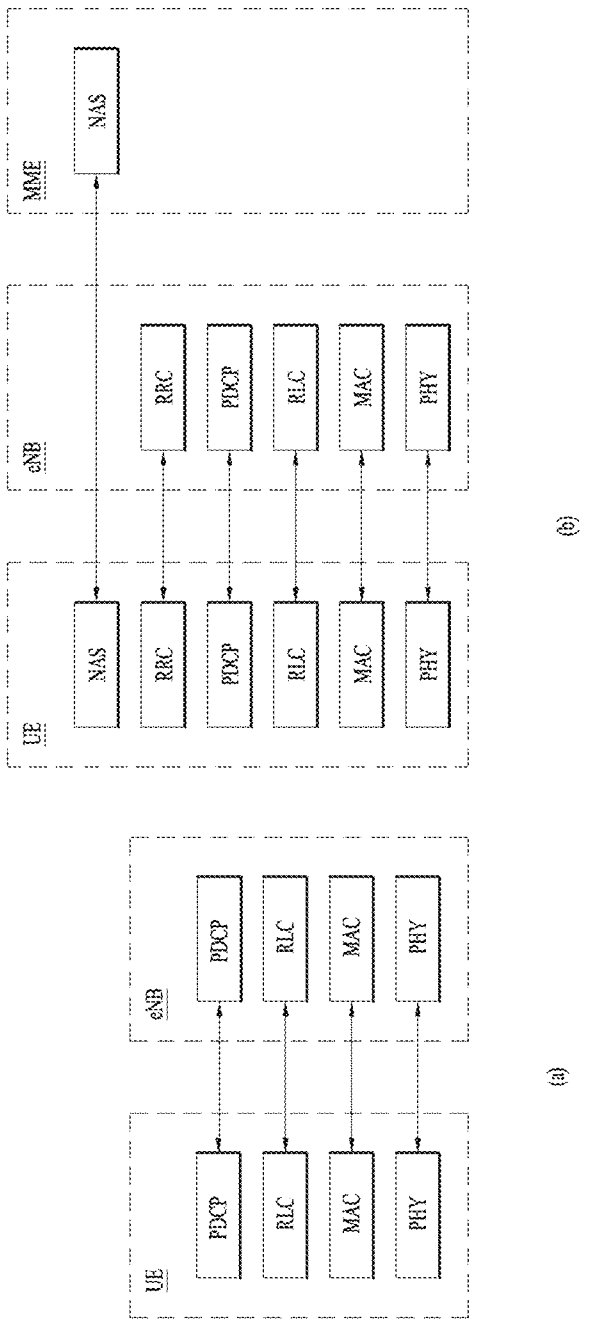
FIG. 3 illustrates radio protocol architectures for user and control planes according to an embodiment of the present disclosure.

FIG. 3(*a*) illustrates a user-plane radio protocol architecture according to an embodiment of the disclosure.

FIG. 3(*b*) illustrates a control-plane radio protocol architecture according to an embodiment of the disclosure. A user plane is a protocol stack for user data transmission, and a control plane is a protocol stack for control signal transmission.

Referring to FIGS. 3(*a*) and 3(*b*), the PHY layer provides an information transfer service to its higher layer on physical channels. The PHY layer is connected to the medium access control (MAC) layer through transport channels and data is transferred between the MAC layer and the PHY layer on the transport channels. The transport channels are divided according to features with which data is transmitted via a radio interface.

Data is transmitted on physical channels between different PHY layers, that is, the PHY layers of a transmitter and a receiver. The physical channels may be modulated in orthogonal frequency division multiplexing (OFDM) and use time and frequencies as radio resources.

The MAC layer provides services to a higher layer, radio link control (RLC) on logical channels. The MAC layer provides a function of mapping from a plurality of logical channels to a plurality of transport channels. Further, the MAC layer provides a logical channel multiplexing function by mapping a plurality of logical channels to a single transport channel. A MAC sublayer provides a data transmission service on the logical channels.

The RLC layer performs concatenation, segmentation, and reassembly for RLC serving data units (SDUs). In order to guarantee various quality of service (QoS) requirements of each radio bearer (RB), the RLC layer provides three operation modes, transparent mode (TM), unacknowledged mode (UM), and acknowledged Mode (AM). An AM RLC provides error correction through automatic repeat request (ARQ).

The RRC layer is defined only in the control plane and controls logical channels, transport channels, and physical channels in relation to configuration, reconfiguration, and release of RBs. An RB refers to a logical path provided by L1 (the PHY layer) and L2 (the MAC layer, the RLC layer, and the packet data convergence protocol (PDCP) layer), for data transmission between the UE and the network.

The user-plane functions of the PDCP layer include user data transmission, header compression, and ciphering. The control-plane functions of the PDCP layer include control-plane data transmission and ciphering/integrity protection.

RB establishment amounts to a process of defining radio protocol layers and channel features and configuring specific parameters and operation methods in order to provide a specific service. RBs may be classified into two types, signaling radio bearer (SRB) and data radio bearer (DRB). The SRB is used as a path in which an RRC message is transmitted on the control plane, whereas the DRB is used as a path in which user data is transmitted on the user plane.

Once an RRC connection is established between the RRC layer of the UE and the RRC layer of the E-UTRAN, the UE is placed in RRC_CONNECTED state, and otherwise, the UE is placed in RRC_IDLE state. In NR, RRC_INACTIVE state is additionally defined. A UE in the RRC_INACTIVE state may maintain a connection to a core network, while releasing a connection from an eNB.

DL transport channels carrying data from the network to the UE include a broadcast channel (BCH) on which system information is transmitted and a DL shared channel (DL SCH) on which user traffic or a control message is transmitted. Traffic or a control message of a DL multicast or broadcast service may be transmitted on the DL-SCH or a DL multicast channel (DL MCH). UL transport channels carrying data from the UE to the network include a random access channel (RACH) on which an initial control message is transmitted and an UL shared channel (UL SCH) on which user traffic or a control message is transmitted.

The logical channels which are above and mapped to the transport channels include a broadcast control channel (BCCH), a paging control channel (PCCH), a common control channel (CCCH), a multicast control channel (MCCH), and a multicast traffic channel (MTCH).

A physical channel includes a plurality of OFDM symbol in the time domain by a plurality of subcarriers in the frequency domain. One subframe includes a plurality of OFDM symbols in the time domain. An RB is a resource allocation unit defined by a plurality of OFDM symbols by a plurality of subcarriers. Further, each subframe may use specific subcarriers of specific OFDM symbols (e.g., the first OFDM symbol) in a corresponding subframe for a physical DL control channel (PDCCH), that is, an L1/L2 control channel. A transmission time interval (TTI) is a unit time for subframe transmission.

Figure 4:
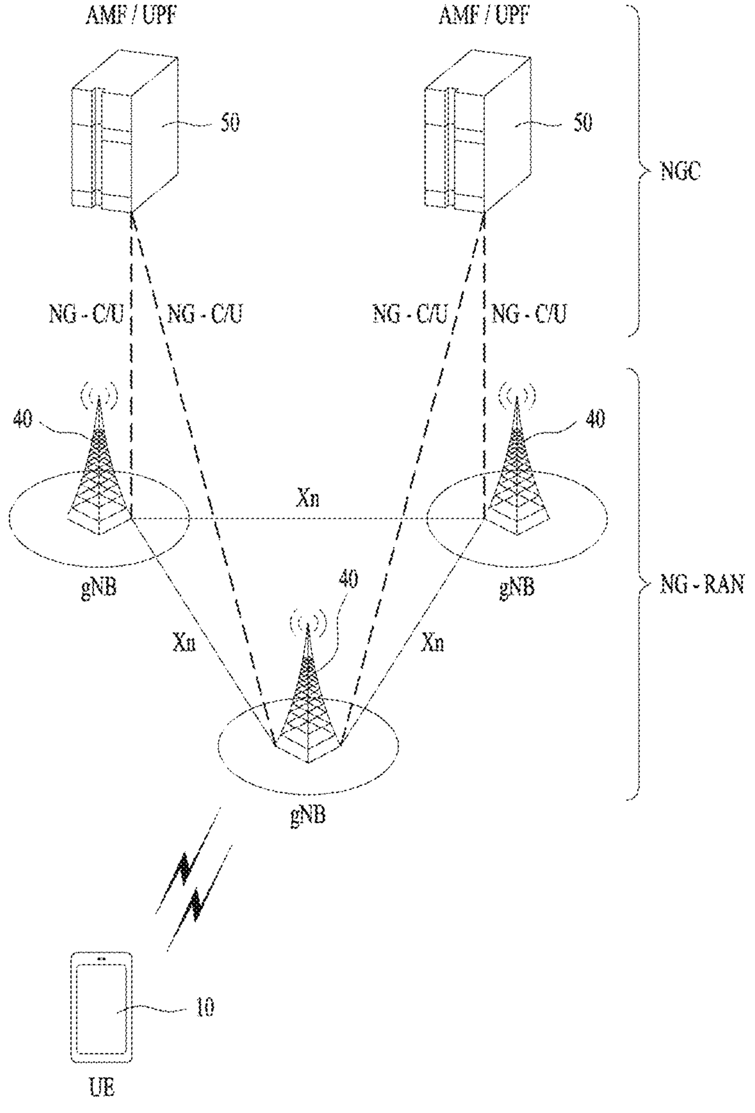
FIG. 4 illustrates the structure of a new radio (NR) system according to an embodiment of the present disclosure.

FIG. 4 illustrates the structure of an NR system according to an embodiment of the present disclosure.

Referring to FIG. 4, a next generation radio access network (NG-RAN) may include a next generation Node B (gNB) and/or an eNB, which provides user-plane and control-plane protocol termination to a UE. In FIG. 4, the NG-RAN is shown as including only gNBs, by way of example. A gNB and an eNB are connected to each other via an Xn interface. The gNB and the eNB are connected to a 5G core network (5GC) via an NG interface. More specifically, the gNB and the eNB are connected to an access and mobility management function (AMF) via an NG-C interface and to a user plane function (UPF) via an NG-U interface.

Figure 5:
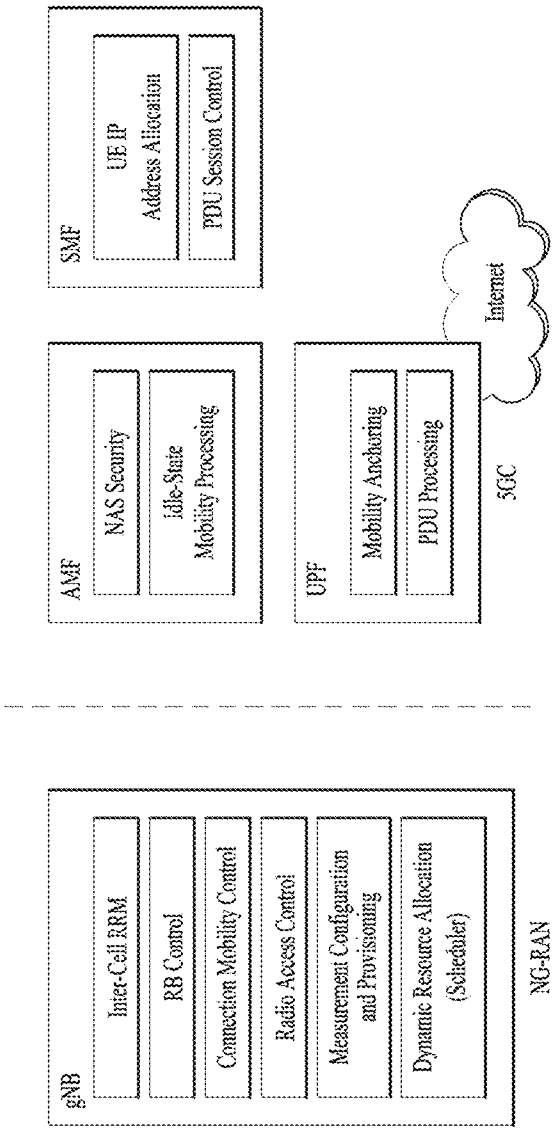
FIG. 5 illustrates a functional division between a next generation radio access network (NG-RAN) and a fifth-generation core (5GC) according to an embodiment of the present disclosure.

FIG. 5 illustrates functional split between the NG-RAN and the 5GC according to an embodiment of the present disclosure.

Referring to FIG. 5, a gNB may provide functions including inter-cell radio resource management (RRM), radio admission control, measurement configuration and provision, and dynamic resource allocation. The AMF may provide functions such as non-access stratum (NAS) security and idle-state mobility processing. The UPF may provide functions including mobility anchoring and protocol data unit (PDU) processing. A session management function (SMF) may provide functions including UE Internet protocol (IP) address allocation and PDU session control.

Figure 6:
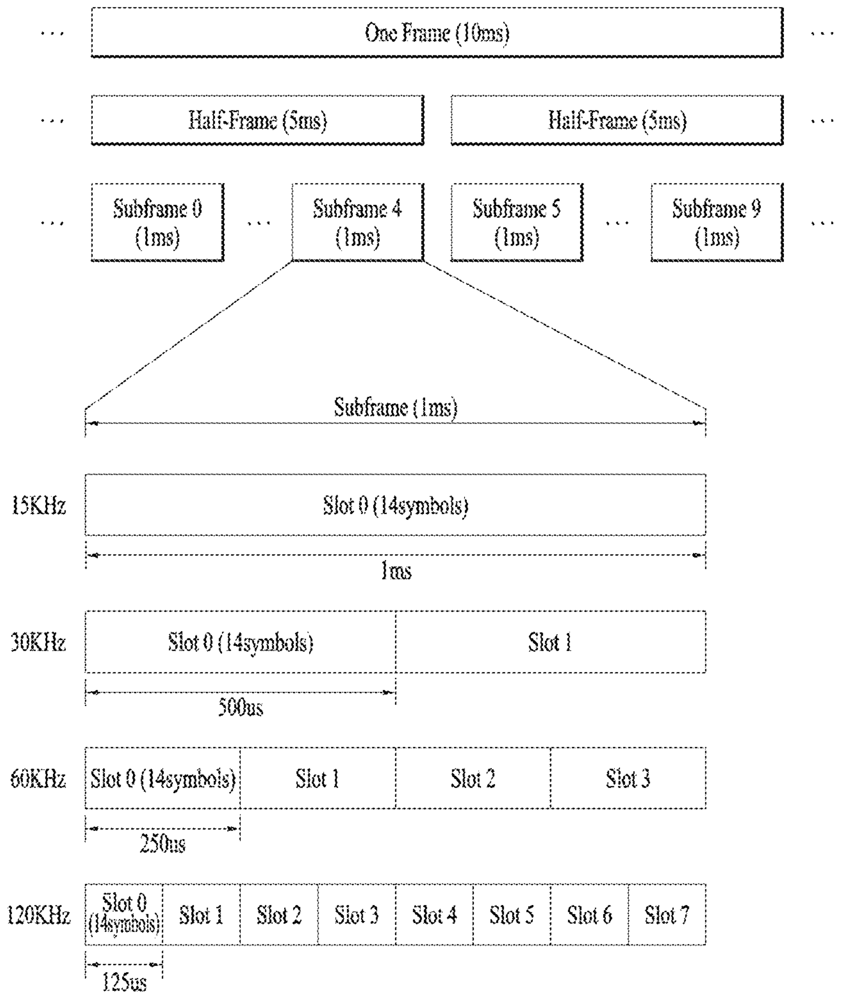
FIG. 6 illustrates the structure of a radio frame of NR to which embodiment(s) are applicable.

FIG. 6 illustrates a radio frame structure in NR, to which embodiment(s) of the present disclosure is applicable.

Referring to FIG. 6, a radio frame may be used for UL transmission and DL transmission in NR. A radio frame is 10 ms in length, and may be defined by two 5-ms half-frames. An HF may include five 1-ms subframes. A subframe may be divided into one or more slots, and the number of slots in an SF may be determined according to a subcarrier spacing (SCS). Each slot may include 12 or 14 OFDM(A) symbols according to a cyclic prefix (CP).

In a normal CP (NCP) case, each slot may include 14 symbols, whereas in an extended CP (ECP) case, each slot may include 12 symbols. Herein, a symbol may be an OFDM symbol (or CP-OFDM symbol) or an SC-FDMA symbol (or DFT-s-OFDM symbol).

Table 1 below lists the number of symbols per slot $N^{slot}_{symb}$, the number of slots per frame $N^{frame,u}_{slot}$, and the number of slots per subframe $N^{subframe,u}_{slot}$ according to an SCS configuration μ in the NCP case.

TABLE 1

| SCS (15*2u) | $N_{symb}^{slot}$ | $N_{slot}^{frame, u}$ | $N_{slot}^{subframe, u}$ |
|---|---|---|---|
| 15 kHz (u = 0) | 14 | 10 | 1 |
| 30 kHz (u = 1) | 14 | 20 | 2 |
| 60 kHz (u = 2) | 14 | 40 | 4 |
| 120 kHz (u = 3) | 14 | 80 | 8 |
| 240 kHz (u = 4) | 14 | 160 | 16 |

Table 2 below lists the number of symbols per slot, the number of slots per frame, and the number of slots per subframe according to an SCS in the ECP case.

TABLE 2

| SCS (15*2^u) | $N_{symb}^{slot}$ | $N_{slot}^{frame, u}$ | $N_{slot}^{subframe, u}$ |
|---|---|---|---|
| 60 kHz (u = 2) | 12 | 40 | 4 |

In the NR system, different OFDM(A) numerologies (e.g., SCSs, CP lengths, and so on) may be configured for a plurality of cells aggregated for one UE. Accordingly, the (absolute time) duration of a time resource including the same number of symbols (e.g., a subframe, slot, or TTI) (collectively referred to as a time unit (TU) for convenience) may be configured to be different for the aggregated cells.

In NR, various numerologies or SCSs may be supported to support various 5G services. For example, with an SCS of 15 kHz, a wide area in traditional cellular bands may be supported, while with an SCS of 30/60 kHz, a dense urban area, a lower latency, and a wide carrier bandwidth may be supported. With an SCS of 60 kHz or higher, a bandwidth larger than 24.25 GHz may be supported to overcome phase noise.

An NR frequency band may be defined by two types of frequency ranges, FR1 and FR2. The numerals in each frequency range may be changed. For example, the two types of frequency ranges may be given in [Table 3]. In the NR system, FR1 may be a "sub 6 GHz range" and FR2 may be an "above 6 GHz range" called millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As mentioned above, the numerals in a frequency range may be changed in the NR system. For example, FR1 may range from 410 MHz to 7125 MHz as listed in [Table 4]. That is, FR1 may include a frequency band of 6 GHz (or 5850, 5900, and 5925 MHz) or above. For example, the frequency band of 6 GHz (or 5850, 5900, and 5925 MHz) or above may include an unlicensed band. The unlicensed band may be used for various purposes, for example, vehicle communication (e.g., autonomous driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 7:
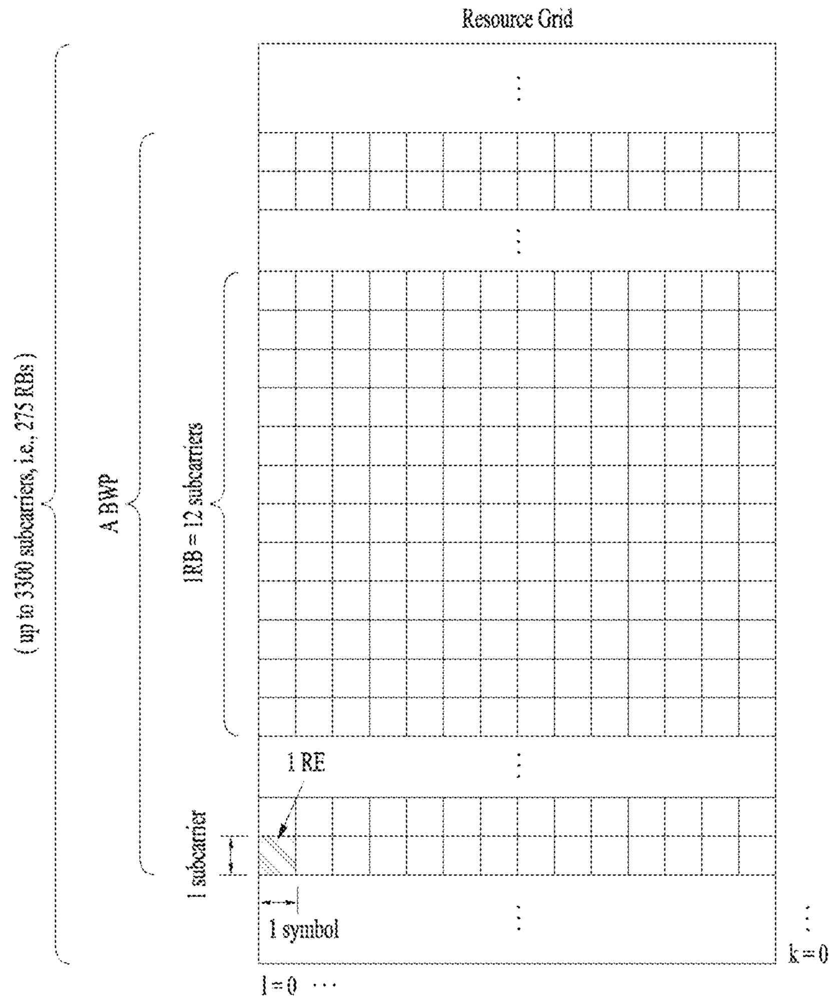
FIG. 7 illustrates the structure of a slot in an NR frame according to an embodiment of the present disclosure.

FIG. 7 illustrates a slot structure in an NR frame according to an embodiment of the present disclosure.

Referring to FIG. 7, a slot includes a plurality of symbols in the time domain. For example, one slot may include 14 symbols in an NCP case and 12 symbols in an ECP case. Alternatively, one slot may include 7 symbols in an NCP case and 6 symbols in an ECP case.

A carrier includes a plurality of subcarriers in the frequency domain. An RB may be defined by a plurality of (e.g., 12) consecutive subcarriers in the frequency domain. A bandwidth part (BWP) may be defined by a plurality of consecutive (physical) RBs ((P)RBs) in the frequency domain and correspond to one numerology (e.g., SCS, CP length, or the like). A carrier may include up to N (e.g., 5) BWPs. Data communication may be conducted in an activated BWP. Each element may be referred to as a resource element (RE) in a resource grid, to which one complex symbol may be mapped.

A radio interface between UEs or a radio interface between a UE and a network may include L1, L2, and L3. In various embodiments of the present disclosure, L1 may refer to the PHY layer. For example, L2 may refer to at least one of the MAC layer, the RLC layer, the PDCH layer, or the SDAP layer. For example, L3 may refer to the RRC layer.

Now, a description will be given of sidelink (SL) communication.

Figure 8:
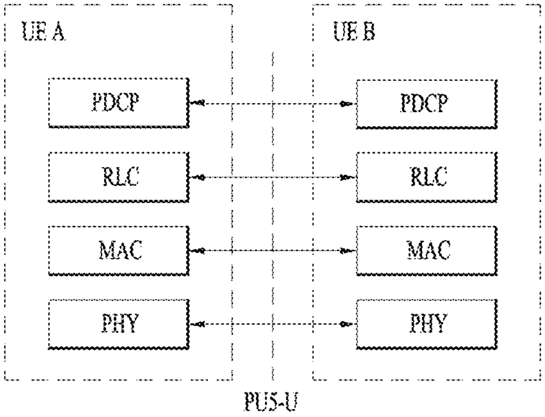
FIG. 8 illustrates a radio protocol architecture for sidelink (SL) communication according to an embodiment of the present disclosure.
Figure 8:
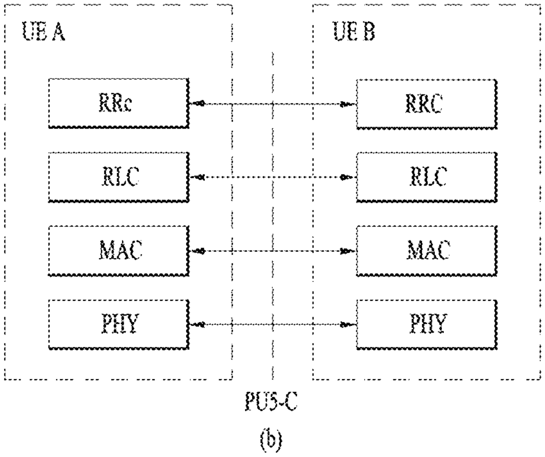

FIG. 8 illustrates a radio protocol architecture for SL communication according to an embodiment of the present disclosure. Specifically, FIG. 8(*a*) illustrates a user-plane protocol stack in LTE, and FIG. 8(*b*) illustrates a control-plane protocol stack in LTE.

Figure 9:
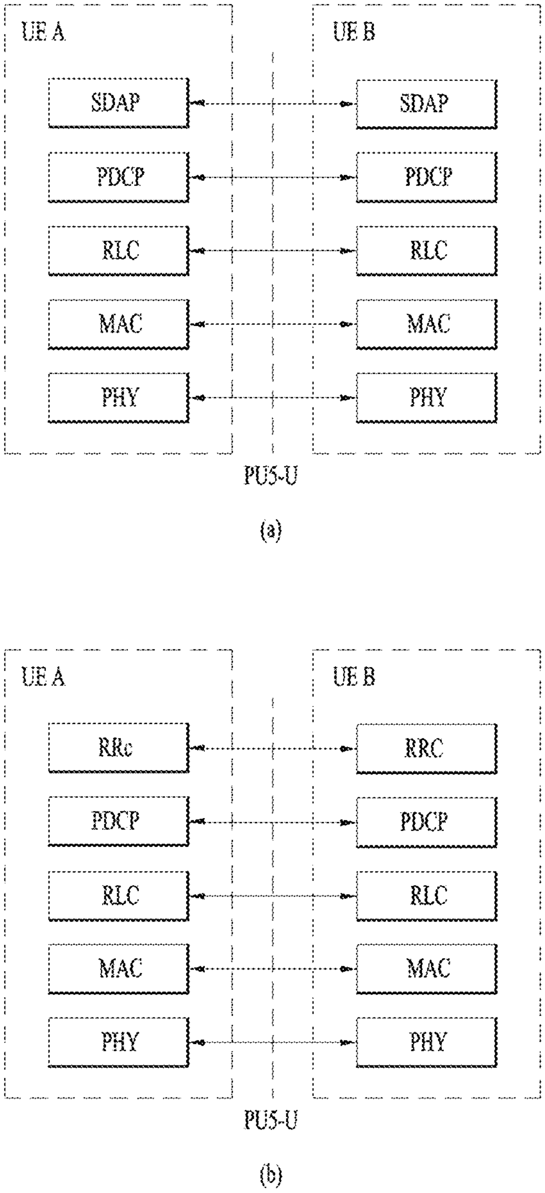
FIG. 9 illustrates a radio protocol architecture for SL communication according to an embodiment of the present disclosure.

FIG. 9 illustrates a radio protocol architecture for SL communication according to an embodiment of the present disclosure. Specifically, FIG. 9(*a*) illustrates a user-plane protocol stack in NR, and FIG. 9(*b*) illustrates a control-plane protocol stack in NR.

Figure 10:
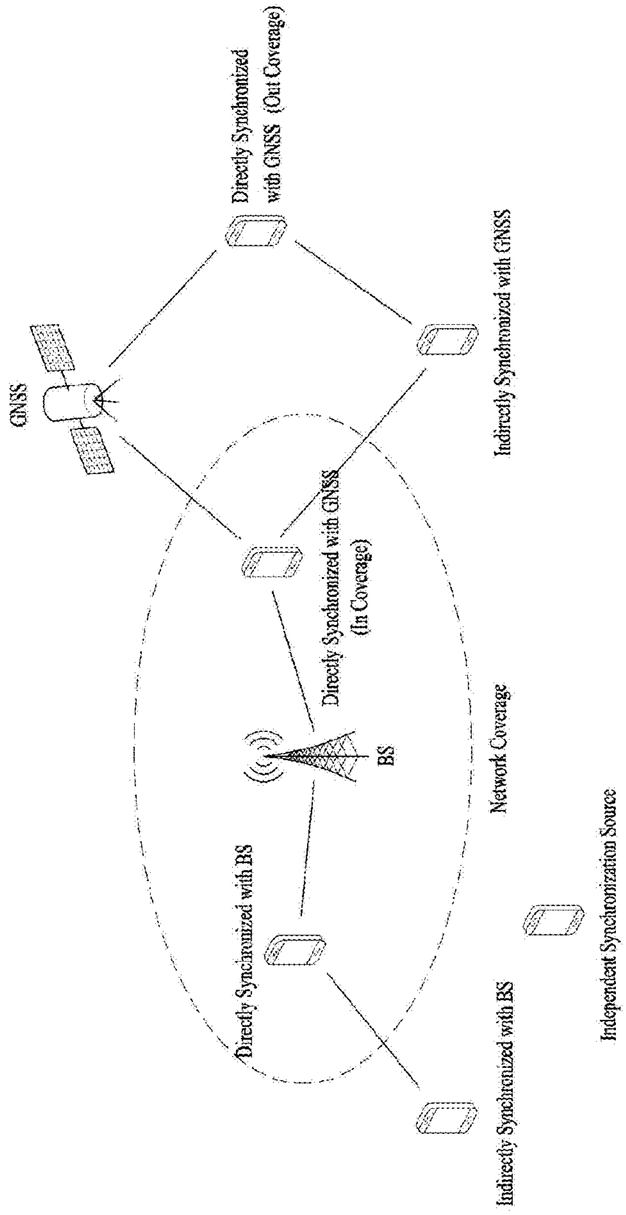
FIG. 10 illustrates a synchronization source or synchronization reference of V2X according to an embodiment of the present disclosure.

FIG. 10 illustrates a synchronization source or synchronization reference of V2X according to an embodiment of the present disclosure.

Referring to FIG. 10, in V2X, a UE may be directly synchronized with global navigation satellite systems (GNSS). Alternatively, the UE may be indirectly synchronized with the GNSS through another UE (within or out of network coverage). If the GNSS is configured as a synchronization source, the UE may calculate a direct frame number (DFN) and a subframe number based on a coordinated universal time (UTC) and a configured (or preconfigured) DFN offset.

Alternatively, a UE may be directly synchronized with a BS or may be synchronized with another UE that is synchronized in time/frequency with the BS. For example, the BS may be an eNB or a gNB. For example, when a UE is in network coverage, the UE may receive synchronization information provided by the BS and may be directly synchronized with the BS. Next, the UE may provide the synchronization information to another adjacent UE. If a timing of the BS is configured as a synchronization reference, the UE may follow a cell associated with a corresponding frequency (when the UE is in cell coverage in frequency) or a primary cell or a serving cell (when the UE is out of cell coverage in frequency), for synchronization and DL measurement.

The BS (e.g., serving cell) may provide a synchronization configuration for a carrier used for V2X/SL communication. In this case, the UE may conform to the synchronization configuration received from the BS. If the UE fails to detect any cell in the carrier used for V2X/SL communication and fails to receive the synchronization configuration from the serving cell, the UE may conform to a preset synchronization configuration.

Alternatively, the UE may be synchronized with another UE that has failed to directly or indirectly acquire the synchronization information from the BS or the GNSS. A synchronization source and a preference may be preconfigured for the UE. Alternatively, the synchronization source and the preference may be configured through a control message provided by the BS.

SL synchronization sources may be associated with synchronization priority levels. For example, a relationship between synchronization sources and synchronization priorities may be defined as shown in Table 5 or 6. Table 5 or 6 is merely an example, and the relationship between synchronization sources and synchronization priorities may be defined in various ways. PG-5T

TABLE 5

| Priority level | GNSS-based synchronization | BS-based synchronization (eNB/gNB-based synchronization) |
|---|---|---|
| P0 | GNSS | BS |
| P1 | All UEs directly synchronized with GNSS | All UEs directly synchronized with BS |
| P2 | All UEs indirectly synchronized with GNSS | All UEs indirectly synchronized with BS |

TABLE 5-continued

| Priority level | GNSS-based synchronization | BS-based synchronization (eNB/gNB-based synchronization) |
|---|---|---|
| P3 | All other UEs | GNSS |
| P4 | N/A | All UEs directly synchronized with GNSS |
| P5 | N/A | All UEs indirectly synchronized with GNSS |
| P6 | N/A | All other UEs |

TABLE 6

| Priority level | GNSS-based synchronization | BS-based synchronization (eNB/gNB-based synchronization) |
|---|---|---|
| P0 | GNSS | BS |
| P1 | All UEs directly synchronized with GNSS | All UEs directly synchronized with BS |
| P2 | All UEs indirectly synchronized with GNSS | All UEs indirectly synchronized with GNSS |
| P3 | BS | GNSS |
| P4 | All UEs directly synchronized with GNSS | All UEs directly synchronized with GNSS |
| P5 | All UEs indirectly synchronized with GNSS | All UEs indirectly synchronized with GNSS |
| P6 | Remaining UE(s) with low priority | Remaining UE(s) with low priority |

In Table 5 or 6, P0 may mean the highest priority, and P6 may mean the lowest priority. In Table 5 or 6, the BS may include at least one of a gNB or an eNB.

Whether to use GNSS-based synchronization or eNB/gNB-based synchronization may be (pre)configured. In a single-carrier operation, the UE may derive a transmission timing thereof from an available synchronization reference having the highest priority.

Hereinafter, a sidelink synchronization signal (SLSS) and synchronization information will be described.

As an SL-specific sequence, the SLSS may include a primary sidelink synchronization signal (PSSS) and a secondary sidelink synchronization signal (SSSS). The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, the UE may use the S-PSS to detect an initial signal and obtain synchronization. In addition, the UE may use the S-PSS and the S-SSS to obtain detailed synchronization and detect a synchronization signal ID.

A physical sidelink broadcast channel (PSBCH) may be a (broadcast) channel for transmitting default (system) information that the UE needs to know first before transmitting and receiving SL signals. For example, the default information may include information related to an SLSS, a duplex mode (DM), a time division duplex (TDD) UL/DL configuration, information related to a resource pool, an application type related to the SLSS, a subframe offset, broadcast information, etc. For example, for evaluation of PSBCH performance in NR V2X, the payload size of the PSBCH may be 56 bits including a CRC of 24 bits.

The S-PSS, S-SSS, and PSBCH may be included in a block format (e.g., SL synchronization signal (SS)/PSBCH block) supporting periodical transmission (hereinafter, the SL SS/PSBCH block is referred to as a sidelink synchronization signal block (S-SSB)). The S-SSB may have the same numerology (i.e., SCS and CP length) as that of a physical sidelink control channel (PSCCH)/physical sidelink shared channel (PSSCH) on a carrier, and the transmission bandwidth may exist within a configured (or preconfigured) SL BWP. For example, the S-SSB may have a bandwidth of 11 RBs. For example, the PSBCH may span 11 RBs. In addition, the frequency position of the S-SSB may be configured (or preconfigured). Therefore, the UE does not need to perform hypothesis detection on frequency to discover the S-SSB on the carrier.

The NR SL system may support a plurality of numerologies with different SCSs and/or different CP lengths. In this case, as the SCS increases, the length of a time resource used by a transmitting UE to transmit the S-SSB may decrease. Accordingly, the coverage of the S-SSB may be reduced. Therefore, in order to guarantee the coverage of the S-SSB, the transmitting UE may transmit one or more S-SSBs to a receiving UE within one S-SSB transmission period based on the SCS. For example, the number of S-SSBs that the transmitting UE transmits to the receiving UE within one S-SSB transmission period may be pre-configured or configured for the transmitting UE. For example, the S-SSB transmission period may be 160 ms. For example, an S-SSB transmission period of 160 ms may be supported for all SCSs.

For example, when the SCS is 15 kHz in FR1, the transmitting UE may transmit one or two S-SSBs to the receiving UE within one S-SSB transmission period. For example, when the SCS is 30 kHz in FR1, the transmitting UE may transmit one or two S-SSBs to the receiving UE within one S-SSB transmission period. For example, when the SCS is 60 kHz in FR1, the transmitting UE may transmit one, two, or four S-SSBs to the receiving UE within one S-SSB transmission period.

Figure 11:
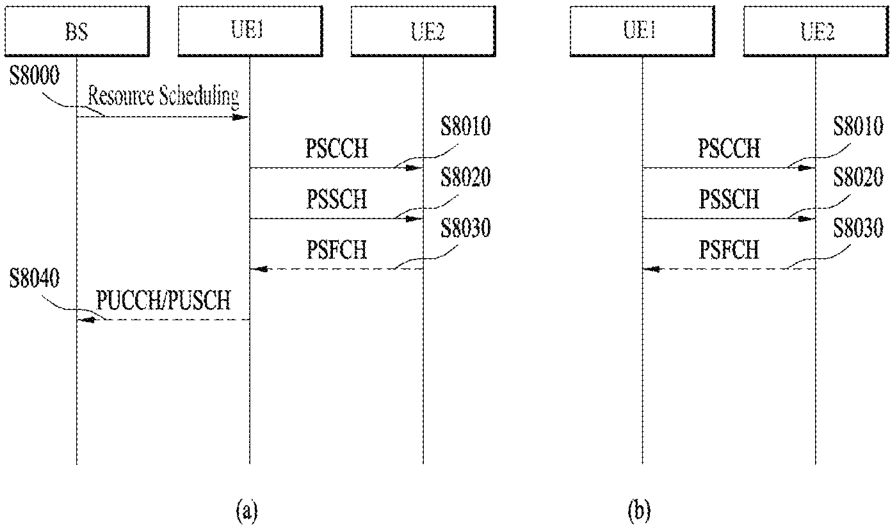
FIG. 11 illustrates a procedure for a user equipment (UE) to perform V2X or SL communication depending on transmission modes according to an embodiment of the present disclosure.

FIG. 11 illustrates a procedure of performing V2X or SL communication by a UE depending on a transmission mode according to an embodiment of the present disclosure. The embodiment of FIG. 11 may be combined with various embodiments of the present disclosure. In various embodiments of the present disclosure, a transmission mode may be referred to as a mode or a resource allocation mode. For the convenience of the following description, a transmission mode in LTE may be referred to as an LTE transmission mode, and a transmission mode in NR may be referred to as an NR resource allocation mode.

For example, FIG. 11(*a*) illustrates a UE operation related to LTE transmission mode 1 or LTE transmission mode 3. Alternatively, for example, FIG. 11(*a*) illustrates a UE operation related to NR resource allocation mode 1. For example, LTE transmission mode 1 may apply to general SL communication, and LTE transmission mode 3 may apply to V2X communication.

For example, FIG. 11(*b*) illustrates a UE operation related to LTE transmission mode 2 or LTE transmission mode 4. Alternatively, for example, FIG. 11(*b*) illustrates a UE operation related to NR resource allocation mode 2.

Referring to FIG. 11 (*a*), in LTE transmission mode 1, LTE transmission mode 3, or NR resource allocation mode 1, a BS may schedule an SL resource to be used for SL transmission by a UE. For example, in step S8000, the BS may transmit information related to an SL resource and/or information related to a UE resource to a first UE. For example, the UL resource may include a PUCCH resource and/or a PUSCH resource. For example, the UL resource may be a resource to report SL HARQ feedback to the BS.

For example, the first UE may receive information related to a Dynamic Grant (DG) resource and/or information related to a Configured Grant (CG) resource from the BS. For example, the CG resource may include a CG type 1 resource or a CG type 2 resource. In the present specification, the DG resource may be a resource configured/allocated by the BS to the first UE in Downlink Control Information (DCI). In the present specification, the CG resource may be a (periodic) resource configured/allocated by the BS to the first UE in DCI and/or an RRC message. For example, for the CG type 1 resource, the BS may transmit an RRC message including information related to the CG resource to the first UE. For example, for the CG type 2 resource, the BS may transmit an RRC message including information related to the CG resource to the first UE, and the BS may transmit DCI for activation or release of the CG resource to the first UE.

In step S8010, the first UE may transmit a PSCCH (e.g., Sidelink Control Information (SCI) or 1st-stage SCI) to a second UE based on the resource scheduling. In step S8020, the first UE may transmit a PSSCH (e.g., 2nd-stage SCI, MAC PDU, data, etc.) related to the PSCCH to the second UE. In step S8030, the first UE may receive a PSFCH related to the PSCCH/PSSCH from the second UE. For example, HARQ feedback information (e.g., NACK information or ACK information) may be received from the second UE over the PSFCH. In step S8040, the first UE may transmit/report HARQ feedback information to the BS over a PUCCH or PUSCH. For example, the HARQ feedback information reported to the BS may include information generated by the first UE based on HARQ feedback information received from the second UE. For example, the HARQ feedback information reported to the BS may include information generated by the first UE based on a preset rule. For example, the DCI may be a DCI for scheduling of SL. For example, the format of the DCI may include DCI format 3_0 or DCI format 3_1. Table 7 shows one example of DCI for scheduling of SL.

TABLE 7

7.3.1.4.1 Format 3_0

DCI format 3_0 is used for scheduling of NR PSCCH and NR PSSCH in one cell.

The following information is transmitted by means of the DCI format 3_0 with CRC scrambled by SL-RNTI or SL-CS-RNTI:

- Resource pool index -$\lceil \log_2 I \rceil$ bits, where I is the number of resource pools for transmission configured by the higher layer parameter sl-TxPoolScheduling.
- Time gap - 3 bits determined by higher layer parameter sl-DCI-ToSL-Trans, as defined in clause 8.1.2.1 of [6, TS 38.214]
- HARQ process number - 4 bits.
- New data indicator - 1 bit.
- Lowest index of the subchannel allocation to the initial transmission - $\lceil \log_2(N_{subChannel}^{SL}) \rceil$ bits as defined in clause 8.1.2.2 of [6, TS 38.214]
- SCI format 1-A fields according to clause 8.3.1.1:
  - Frequency resource assignment.
  - Time resource assignment.
- PSFCH-to-HARQ feedback timing indicator -$\lceil \log_2 N_{fb\_timing} \rceil$ bits, where $N_{fb\_timing}$ is the number of entries in the higher layer parameter sl-PSFCH-ToPUCCH, as defined in clause 16.5 of [5, TS 38.213]
- PUCCH resource indicator - 3 bits as defined in clause 16.5 of [5, TS 38.213].
- Configuration index - 0 bit if the UE is not configured to monitor DCI format 3_0 with CRC scrambled by SL-CS-RNTI; otherwise 3 bits as defined in clause 8.1.2 of [6, TS 38.214]. If the UE is configured to monitor DCI format 3_0 with CRC scrambled by SL-CS-RNTI, this field is reserved for DCI format 3_0 with CRC scrambled by SL-RNTI.
- Counter sidelink assignment index - 2 bits
  - 2 bits as defined in clause 16.5.2 of [5, TS 38.213] if the UE is configured with pdsch-HARQ-ACK-Codebook = dynamic
  - 2 bits as defined in clause 16.5.1 of [5, TS 38.213] if the UE is configured with pdsch-HARQ-ACK-Codebook = semi-static
- Padding bits, if required If multiple transmit resource pools are provided in sl-TxPoolScheduling, zeros shall be appended to the DCI format 3_0 until the payload size is equal to the size of a DCI format 3_0 given by a configuration of the transmit resource pool resulting in the largest number of information bits for DCI format 3_0.

If the UE is configured to monitor DCI format 3_1 and the number of information bits in DCI format 3_0 is less than the payload of DCI format 3_1, zeros shall be appended to DCI format 3_0 until the payload size equals that of DCI format 3_1.

7.3.1.4.2 Format 3_1

DCI format 3_1 is used for scheduling of LTE PSCCH and LTE PSSCH in one cell.

TABLE 7-continued

| |
|---|
| The following information is transmitted by means of the DCI format 3_1 with CRC scrambled by SL Semi-Persistent Scheduling V-RNTI: |
| - Timing offset - 3 bits determined by higher layer parameter sl-TimeOffsetEUTRA-List, as defined in clause 16.6 of [5, TS 38.213] |
| - Carrier indicator -3 bits as defined in 5.3.3.1.9A of [11, TS 36.212]. |
| - Lowest index of the subchannel allocation to the initial transmission - $\lceil \log_2(N_{subsubchannel}^{SL}) \rceil$ bits as defined in 5.3.3.1.9A of [11, TS 36.212]. |
| - Frequency resource location of initial transmission and retransmission, as defined in 5.3.3.1.9A of [11, TS 36.212] |
| - Time gap between initial transmission and retransmission, as defined in 5.3.3.1.9A of [11, TS 36.212] |
| - SL index - 2 bits as defined in 5.3.3.1.9A of [11, TS 36.212] |
| - SL SPS configuration index - 3 bits as defined in clause 5.3.3.1.9A of [11, TS 36.212]. |
| - Activation/release indication - 1 bit as defined in clause 5.3.3.1.9A of [11, TS 36.212]. |

Referring to FIG. 11 (*b*), in an LTE transmission mode 2, an LTE transmission mode 4, or an NR resource allocation mode 2, a UE may determine an SL transmission resource within an SL resource configured by a BS/network or a preconfigured SL resource. For example, the configured SL resource or the preconfigured SL resource may be a resource pool. For example, the UE may autonomously select or schedule resources for SL transmission. For example, the UE may perform SL communication by selecting a resource by itself within a configured resource pool. For example, the UE may perform sensing and resource (re)selection procedures to select a resource by itself within a selection window. For example, the sensing may be performed in unit of a sub-channel. For example, in the step S8010, the first UE having self-selected a resource in the resource pool may transmit PSCCH (e.g., Side Link Control Information (SCI) or $1^{st}$-stage SCI) to the second UE using the resource. In the step S8020, the first UE may transmit PSSCH (e.g., $2^{nd}$-stage SCI, MAC PDU, data, etc.) related to the PSCCH to the second UE. In the step S8030, the first UE may receive PSFCH related to the PSCCH/PSSCH from the second UE.

Referring to FIG. 11 (*a*) or FIG. 11 (*b*), for example, the first UE may transmit the SCI to the second UE on the PSCCH. Alternatively, for example, the first UE may transmit two consecutive SCIs (e.g., two-stage SCI) to the second UE on the PSCCH and/or PSSCH. In this case, the second UE may decode the two consecutive SCIs (e.g., two-stage SCI) to receive the PSSCH from the first UE. In the present specification, the SCI transmitted on the PSCCH may be referred to as a $1^{st}$ SCI, a 1st-stage SCI, or a 1st-stage SCI format, and the SCI transmitted on the PSSCH may be referred to as a 2nd SCI, a 2nd SCI, a 2nd-stage SCI format. For example, the 1st-stage SCI format may include SCI format 1-A, and the $2^{nd}$-stage SCI format may include SCI format 2-A and/or SCI format 2-B. Table 8 shows one example of a 1st-stage SCI format.

TABLE 8

8.3.1.1 SCI format 1-A

SCI format 1-A is used for the scheduling of PSSCH and $2^{nd}$-stage-SCI on PSSCH The following information is transmitted by means of the SCI format 1-A:

- Priority - 3 bits as specified in clause 5.4.3.3 of [12, TS 23.287] and clause 5.22.1.3.1 of [8, TS 38.321]. Value '000' of Priority field corresponds to priority value '1', value '001' of Priority field corresponds to priority value '2', and so on.

- Frequency resource assignment - $\left\lceil \log_2\left(\frac{N_{subChannel}^{SL}(N_{subChannel}^{SL}+1)}{2}\right)\right\rceil$ bits when the value of the higher layer parameter sl-MaxNumPerReserve is configured to 2; otherwise $\left\lceil \log_2\left(\frac{N_{subChannel}^{SL}(N_{subChannel}^{SL}+1)(2N_{subChannel}^{SL}+1)}{6}\right)\right\rceil$ bits when the value of the higher layer parameter sl-MaxNumPerReserve is configured to 3, as defined in clause 8.1.5 of [6, TS 38.214].

- Time resource assignment - 5 bits when the value of the higher layer parameter sl-MaxNumPerReserve is configured to 2; otherwise 9 bits when the value of the higher layer parameter sl-MaxNumPerReserve is configured to 3, as defined in clause 8.1.5 of [6, TS 38.214].

- Resource reservation period -$\lceil \log_2 N_{rsv\_period} \rceil$ bits as defined in clause 16.4 of [5, TS 38.213], where $N_{rsv\_period}$ is the number of entries in the higher layer parameter sl-ResourceReservePeriodList, if higher layer parameter sl-MultiReserveResource is configured; 0 bit otherwise.

- DMRS pattern - $\lceil \log_2 N_{pattern} \rceil$ bits as defined in clause 8.4.1.1.2 of [4, TS 38.211], where $N_{pattern}$ is the number of DMRS patterns configured by higher layer parameter sl-PSSCH-DMRS-TimePatternList.

- $2^{nd}$-stage SCI format - 2 bits as defined in Table 8.3.1.1-1.

- Beta_offset indicator - 2 bits as provided by higher layer parameter sl-BetaOffsets2ndSCI and Table 8.3.1.1-2.

- Number of DMRS port - 1 bit as defined in Table 8.3.1.1-3.

- Modulation and coding scheme - 5 bits as defined in clause 8.1.3 of [6, TS 38.214].

TABLE 8-continued

| |
|---|
| - Additional MCS table indicator - as defined in clause 8.1.3.1 of [6, TS 38.214]: 1 bit if one MCS table is configured by higher layer parameter sl-Additional-MCS-Table; 2 bits if two MCS tables are configured by higher layer parameter sl-Additional-MCS-Table; 0 bit otherwise. |
| - PSFCH overhead indication - 1 bit as defined clause 8.1.3.2 of [6, TS 38.214] if higher layer parameter sl-PSFCH-Period = 2 or 4; 0 bit otherwise. |
| - Reserved - a number of bits as determined by higher layer parameter sl-NumReservedBits, with value set to zero. |

Table 9 shows exemplary 2nd-stage SCI formats.

TABLE 9

8.4 Sidelink control information on PSSCH

SCI carried on PSSCH is a 2nd-stage SCI, which transports sidelink scheduling information.

8.4.1 2nd-stage SCI formats

The fields defined in each of the $2^{nd}$-stage SCI formats below are mapped to the information bits $a_0$ to $a_{A-1}$ as follows:

Each field is mapped in the order in which it appears in the description, with the first field mapped to the lowest order information bit $a_0$ and each successive field mapped to higher order information bits. The most significant bit of each field is mapped to the lowest order information bit for that field, e.g. the most significant bit of the first field is mapped to $a_0$.

8.4.1.1 SCI format 2-A

SCI format 2-A is used for the decoding of PSSCH, with HARQ operation when HARQ-ACK information includes ACK or NACK, when HARQ-ACK information includes only NACK, or when there is no feedback of HARQ-ACK information.

The following information is transmitted by means of the SCI format 2-A:

- HARQ process number - 4 bits.
- New data indicator - 1 bit.
- Redundancy version - 2 bits as defined in Table 7.3.1.1.1-2.
- Source ID - 8 bits as defined in clause 8.1 of [6, TS 38.214].
- Destination ID - 16 bits as defined in clause 8.1 of [6, TS 38.214].
- HARQ feedback enabled/disabled indicator - 1 bit as defined in clause 16.3 of [5, TS 38.213].
- Cast type indicator - 2 bits as defined in Table 8.4.1.1-1 and in clause 8.1 of [6, TS 38.214].
- CSI request - 1 bit as defined in clause 8.2.1 of [6, TS 38.214] and in clause 8.1 of [6, TS 38.214].

Referring to FIG. 11(*a*) or FIG. 11(*b*), in step S8030, a first UE may receive a PSFCH based on Table 10. For example, the first UE and a second UE may determine a PSFCH resource based on Table 10, and the second UE may transmit HARQ feedback to the first UE on the PSFCH resource.

TABLE 10

16.3 UE procedure for reporting HARQ-ACK on sidelink

A UE can be indicated by an SCI format scheduling a PSSCH reception to transmit a PSFCH with HARQ-ACK information in response to the PSSCH reception. The UE provides HARQ-ACK information that includes ACK or NACK, or only NACK.

A UE can be provided, by sl-PSFCH-Period, a number of slots in a resource pool fo a period of PSFCH transmission occasion resources. If the number is zero, PSFCH transmissions from the UE in the resource pool are disabled.

A UE expects that a slot $t'^{SL}_k$ ($0 \le k < T'_{max}$) has a PSFCH transmission occasion resource if k mod $N_{PSSCH}^{PSFCH} = 0$, where $t'^{SL}_k$ is defined in [6, TS 38.214], and $T'_{max}$ is a number of slots that belong to the resource pool within 10240 msec according to [6, TS 38.214], and $N_{PSSCH}^{PSFCH}$ is provided by sl-PSFCH-Period.

A UE may be indicated by higher layers to not transmit a PSFCH in response to a PSSCH reception [11, TS 38.321].

If a UE receives a PSSCH in a resource pool and the HARQ feedback enabled/disabled indicator field in an associated SCI format 2-A or a SCI format 2-B has value 1 [5, TS 38.212], the UE provides the HARQ-ACK information in a PSFCH transmission in the resource pool. The UE transmits the PSFCH in a first slot that includes PSFCH resources and is at least a number of slots, provided by sl-MinTimeGapPSFCH, of the resource pool after a last slot of the PSSCH reception.

A UE is provided by sl-PSFCH-RB-Set a set of $M_{PRB, set}^{PSFCH}$ PRBs in a resource pool for PSFCH transmission in a PRB of the resource pool. For a number of $N_{subch}$ sub-channels for the resource pool, provided by sl-NumSubchannel, and a number of PSSCH slots associated with a PSFCH slot that is less than or equal to $N_{PSSCH}^{PSFCH}$, the UE allocates the $[(i + j \cdot N_{PSSCH}^{PSFCH}) \cdot M_{subch, slot}^{PSFCH}, (i + 1 + j \cdot N_{PSSCH}^{PSFCH}) \cdot M_{subch, slot}^{PSFCH} - 1]$ PRBs from the $M_{PRB, set}^{PSFCH}$ PRBs to slot i among the PSSCH slots associated with the PSFCH slot and sub-channel j, where $M_{subch, slot}^{PSFCH} = M_{PRB, set}^{PSFCH}/(N_{subch} \cdot N_{PSSCH}^{PSFCH})$, $0 \le i < N_{PSSCH}^{PSFCH}$, $0 \le j < N_{subch}$, and the allocation starts in an ascending order of i and continues in an ascending order of j. The UE expects that $M_{PRB, set}^{PSFCH}$ is a multiple of $N_{subch} \cdot N_{PSSCH}^{PSFCH}$.

The second OFDM symbol l' of PSFCH transmission in a slot is defined as l' =

TABLE 10-continued

| |
|---|
| sl-StartSymbol + sl-LengthSymbols − 2.<br>A UE determines a number of PSFCH resources available for multiplexing HARQ-ACK information in a PSFCH transmission as $R_{PRB,\ CS}^{PSFCH} = N_{type}^{PSFCH} \cdot M_{subch,\ slot}^{PSFCH} \cdot N_{CS}^{PSFCH}$ where $N_{CS}^{PSFCH}$ is a number of cyclic shift pairs for the resource pool provided by sl-NumMuxCS-Pair and, based on an indication by sl-PSFCH-CandidateResourceType,<br>- if sl-PSFCH-CandidateResourceType is configured as startSubCH, $N_{type}^{PSFCH} = 1$ and the $M_{subch,\ slot}^{PSFCH}$ PRBs are associated with the starting sub-channel of the corresponding PSSCH;<br>- if sl-PSFCH-CandidateResourceType is configured as allocSubCH, $N_{type}^{PSFCH} = N_{subch}^{PSSCH}$ and the $N_{subch}^{PSSCH} \cdot M_{subch,\ slot}^{PSFCH}$ PRBs are associated with the $N_{subch}^{PSSCH}$ sub-channels of the corresponding PSSCH.<br>The PSFCH resources are first indexed according to an ascending order of the PRB index, from the $N_{type}^{PSFCH} \cdot M_{subch,\ slot}^{PSFCH}$ PRBs, and then according to an ascending order of the cyclic shift pair index from the $N_{CS}^{PSFCH}$ cyclic shift pairs.<br>A UE determines an index of a PSFCH resource for a PSFCH transmission in response to a PSSCH reception as $(P_{ID} + M_{ID}) \bmod R_{PRB,\ CS}^{PSFCH}$ where $P_{ID}$ is a physical layer source ID provided by SCI format 2-A or 2-B [5, TS 38.212] scheduling the PSSCH reception, and $M_{ID}$ is the identity of the UE receiving the PSSCH as indicated by higher layers if the UE detects a SCI format 2-A with Cast type indicator field value of "01"; otherwise, $M_{ID}$ is zero.<br>A UE determines a $m_0$ value, for computing a value of cyclic shift $\alpha$ [4, TS 38.211], from a cyclic shift pair index corresponding to a PSFCH resource index and from $N_{CS}^{PSFCH}$ using Table 16.3-1. |

Referring to FIG. 11(*a*), in step S8040, the first UE may transmit SL HARQ feedback to the BS over a PUCCH and/or PUSCH based on Table 11.

TABLE 11

| |
|---|
| 16.5 UE procedure for reporting HARQ-ACK on uplink<br>A UE can be provided PUCCH resources or PUSCH resources [12, TS 38.331] to report HARQ-ACK information that the UE generates based on HARQ-ACK information that the UE obtains from PSFCH receptions, or from absence of PSFCH receptions. The UE reports HARQ-ACK information on the primary cell of the PUCCH group, as described in clause 9, of the cell where the UE monitors PDCCH for detection of DCI format 3_0.<br>For SL configured grant Type 1 or Type 2 PSSCH transmissions by a UE within a time period provided by sl-PeriodCG, the UE generates one HARQ-ACK information bit in response to the PSFCH receptions to multiplex in a PUCCH transmission occasion that is after a last time resource, in a set of time resources.<br>For PSSCH transmissions scheduled by a DCI format 3_0, a UE generates HARQ-ACK information in response to PSFCH receptions to multiplex in a PUCCH transmission occasion that is after a last time resource in a set of time resources provided by the DCI format 3_0.<br>From a number of PSFCH reception occasions, the UE generates HARQ-ACK information to report in a PUCCH or PUSCH transmission. The UE can be indicated by a SCI format to perform one of the following and the UE constructs a HARQ-ACK codeword with HARQ-ACK information, when applicable<br>- for one or more PSFCH reception occasions associated with SCI format 2-A with Cast type indicator field value of "10"<br>- generate HARQ-ACK information with same value as a value of HARQ-ACK information the UE determines from the last PSFCH reception from the number of PSFCH reception occasions corresponding to PSSCH transmissions or, if the UE determines that a PSFCH is not received at the last PSFCH reception occasion and ACK is not received in any of previous PSFCH reception occasions, generate NACK<br>- for one or more PSFCH reception occasions associated with SCI format 2-A with Cast type indicator field value of "01"<br>- generate ACK if the UE determines ACK from at least one PSFCH reception occasion, from the number of PSFCH reception occasions corresponding to PSSCH transmissions, in PSFCH resources corresponding to every identity $M_{ID}$ of the UEs that the UE expects to receive the PSSCH, as described in clause 16.3; otherwise, generate NACK<br>- for one or more PSFCH reception occasions associated with SCI format 2-B or SCI format 2-A with Cast type indicator field value of "11"<br>- generate ACK when the UE determines absence of PSFCH reception for the last PSFCH reception occasion from the number of PSFCH reception occasions corresponding to PSSCH transmissions; otherwise, generate NACK<br>After a UE transmits PSSCHs and receives PSFCHs in corresponding PSFCH resource occasions, the priority value of HARQ-ACK information is same as the priority value of the PSSCH transmissions that is associated with the PSFCH reception occasions providing the HARQ-ACK information.<br>The UE generates a NACK when, due to prioritization, as described in clause 16.2.4, the UE does not receive PSFCH in any PSFCH reception occasion associated with a PSSCH transmission in a resource provided by a DCI format 3_0 or, for a configured grant, in a resource provided in a single period and for which the UE is provided a PUCCH resource to report HARQ-ACK information. The priority value of the NACK is same as the priority value of the PSSCH transmission.<br>The UE generates a NACK when, due to prioritization as described in clause 16.2.4, the UE does not transmit a PSSCH in any of the resources provided by a DCI format 3_0 or, for a |

TABLE 11-continued configured grant, in any of the resources provided in a single period and for which the UE is provided a PUCCH resource to report HARQ-ACK information. The priority value of the NACK is same as the priority value of the PSSCH that was not transmitted due to prioritization.

The UE generates an ACK if the UE does not transmit a PSCCH with a SCI format 1-A scheduling a PSSCH in any of the resources provided by a configured grant in a single period and for which the UE is provided a PUCCH resource to report HARQ-ACK information. The priority value of the ACK is same as the largest priority value among the possible priority values for the configured grant.

Table 12 below shows details of selection and reselection of an SL relay UE defined in 3GPP TS 36.331. The contents of Table 12 are used as the prior art of the present disclosure, and related necessary details may be found in 3GPP TS 36.331.

TABLE 12

5.10.11.4 Selection and reselection of sidelink relay UE

A UE capable of sidelink remote UE operation that is configured by upper layers to search for a sidelink relay UE shall:

1> if out of coverage on the frequency used for sidelink communication, as defined in TS 36.304 [4], clause 11.4; or 1> if the serving frequency is used for sidelink communication and the RSRP measurement of the cell on which the UE camps (RRC_IDLE)/ the PCell (RRC_CONNECTED) is below threshHigh within remoteUE-Config :

2> search for candidate sidelink relay UEs, in accordance with TS 36.133 [16]

2> when evaluating the one or more detected sidelink relay UEs, apply layer 3 filtering as specified in 5.5.3.2 across measurements that concern the same ProSe Relay UE ID and using the filterCoefficient in SystemInformationBlockType19 (in coverage) or the preconfigured filterCoefficient as defined in 9.3(out of coverage), before using the SD-RSRP measurement results;

NOTE 1: The details of the interaction with upper layers are up to UE implementation.

2> if the UE does not have a selected sidelink relay UE:

3> select a candidate sidelink relay UE which SD-RSRP exceeds q-RxLevMin included in either reselectionInfoIC (in coverage) or reselectionInfoOoC (out of coverage) by minHyst;

2> else if SD-RSRP of the currently selected sidelink relay UE is below q-RxLevMin included in either reselectionInfoIC (in coverage) or reselectionInfoOoC (out of coverage); or if upper layers indicate not to use the currently selected sidelink relay: (i.e. sidelink relay UE reselection):

3> select a candidate sidelink relay UE which SD-RSRP exceeds q-RxLevMin included in either reselectionInfoIC (in coverage) or reselectionInfoOoC (out of coverage) by minHyst;

2> else if the UE did not detect any candidate sidelink relay UE which SD-RSRP exceeds q-RxLevMin included in either reselectionInfoIC (in coverage) or reselectionInfoOoC (out of coverage) by minHyst:

3> consider no sidelink relay UE to be selected;

NOTE 2: The UE may perform sidelink relay UE reselection in a manner resulting in selection of the sidelink relay UE, amongst all candidate sidelink relay UEs meeting higher layer criteria, that has the best radio link quality. Further details, including interaction with upper layers, are up to UE implementation.

5.10.11.5 Sidelink remote UE threshold conditions

A UE capable of sidelink remote UE operation shall:

1> if the threshold conditions specified in this clause were not met:

2> if threshHigh is not included in remoteUE-Config within SystemInformationBlockType19; or 2> if threshHigh is included in remoteUE-Config within SystemInformationBlockType19; and the RSRP measurement of the PCell, or the cell on which the UE camps, is below threshHigh by hystMax (also included within remoteUE-Config):

3> consider the threshold conditions to be met (entry);

1> else:

2> if threshHigh is included in remoteUE-Config within SystemInformationBlockType19; and the RSRP measurement of the PCell, or the cell on which the UE camps, is above threshHigh (also included within remoteUE-Config):

3> consider the threshold conditions not to be met (leave);

Sidelink (SL) Discontinuous Reception (DRX)

A MAC entity may be configured by an RRC as a DRX function of controlling a PDCCH monitoring activity of a UE for C-RNTI, CI-RNTI, CS-RNTI, INT-RNTI, SFI-RNTI, SP-CSI-RNTI, TPC-PUCCH-RNTI, TPC-PUSCH-RNTI, TPC-SRS-RNTI, AI-RNTI, SL-RNTI, SLCS-RNTI, and SL Semi-Persistent Scheduling V-RNTI of the MAC entity. When using a DRX operation, a MAC entity should monitor PDCCH according to prescribed requirements. When DRX is configured in RRC_CONNECTED, a MAC entity may discontinuously monitor PDCCH for all activated serving cells.

RRC may control a DRX operation by configuring the following parameters.

drx-onDurationTimer: Duration time upon DRX cycle start drx-SlotOffset: Delay before drx-onDurationTimer start drx-InactivityTimer: Duration time after PDCCH that indicates new UL or DL transmission for a MAC entity drx-RetransmissionTimerDL (per DL HARQ process except for the broadcast process): Maximum duration time until DL retransmission is received drx-RetransmissionTimerUL (per UL HARQ process): Maximum time until a grat for retransmission is received drx-LongCycleStartOffset: Long DRX cycle and drx-StartOffset that define a subframe in which Long and Short DRX cycles start drx-ShortCycle (optional): Short DRX cycle drx-ShortCycleTimer (optional): Period for a UE to follow a short CRX cycle drx-HARQ-RTT-TimerDL (per DL HARQ process except for the broadcast process): Minimum duration time before DL allocation for HARQ retransmission is predicted by a MAC entity drx-HARQ-RTT-TimerUL (per UL HARQ process): Minimum duration time before a UL HARQ retransmission grant is predicted by a MAC entity drx-RetransmissionTimerSL (per HARQ process): Maximum period until a grant for SL retransmission is received drx-HARQ-RTT-TimerSL (per HARQ process): Minimum duration time before an SL retransmission grant is predicted by a MAC entity ps-Wakeup (optional): Configuration for starting drx-on DurationTimer connected when DCP is monitored but not detected ps-TransmitOtherPeriodicCSI (optional): Configuration to report a periodic CSI that is not L1-RSRP on PUCCH for a time duration period indicated by drx-onDurationTimer when connected drx-onDurationTimer does not start despite that DCP is configured ps-TransmitPeriodicL1-RSRP (optional): Configuration to transmit a periodic CSI that is L1-RSRP on PUCCH for a time indicated by a drx-onDurationTimer when a connected drx-onDurationTimer does not start despite that DCP is configured A serving cell of a MAC entity may be configured by RRC in two DRX groups having separate DRX parameters. When the RRC does not configure a secondary DRX group, a single DRX group exists only and all serving cells belong to the single DRX group. When two DRX groups are configured, each serving cell is uniquely allocated to each of the two groups. DRX parameters separately configured for each DRX group include drx-onDurationTimer and drx-InactivityTimer. A DRX parameter common to a DRX group is as follows.

drx-onDurationTimer, drx-InactivityTimer.

DRX parameters common to a DRX group are as follows.

drx-SlotOffset, drx-RetransmissionTimerDL, drx-Retrans drx-SlotOffset, drx-RetransmissionTimerDL, drx-RetransmissionTimerUL, drx-LongCycleStartOffset, drx-ShortCycle (optional), drx-ShortCycleTimer (optional), drx-HARQ-RTT-TimerDL, and drx-HARQ-RTT-TimerUL.

In addition, in a Uu DRX operation of the related art, drx-HARQ-RTT-TimerDL, drx-HARQ-RTT-TimerUL, drx-RetransmissionTimerDL, and drx-RetransmissionTimerUL are defined. When UE HARQ retransmission is performed, it is secured to make transition to a sleep mode during RTT timer (drx-HARQ-RTT-TimerDL, drx-HARQ-RTT-TimerUL) or to maintain an active state during Retransmission Timer (drx-RetransmissionTimerDL, drx-Retransmission-TimerUL).

In addition, for details of SL DRX, SL DRX-related contents of TS 38.321 and R2-2111419 may be referred to as the related art.

Tables 13 to 16 below are descriptions related to sidelink DRX disclosed in the 3GPP TS 38.321 V16.2.1 and are used as the prior art of the present disclosure.

TABLE 13

The MAC entity may be configured by RRC with a DRX functionality that controls the UE's PDCCH monitoring activity for the MAC entity's C-RNTI, CI-RNTI, CS-RNTI, INT-RNTI, SFI-RNTI, SP-CSI-RNTI, TPC-PUCCH-RNTI, TPC-PUSCH-RNTI, TPC-SRS-RNTI, and AI-RNTI. When using DRX operation, the MAC entity shall also monitor PDCCH according to requirements found in other clauses of this specification. When in RRC_CONNECTED, if DRX is configured, for all the activated Serving Cells, the MAC entity may monitor the PDCCH discontinuously using the DRX operation specified in this clause; otherwise the MAC entity shall monitor the PDCCH as specified in TS 38.213 [6].

NOTE 1: If Sidelink resource allocation mode 1 is configured by RRC, a DRX functionality is not configured.

RRC controls DRX operation by configuring the following parameters:

- drx-onDurationTimer: the duration at the beginning of a DRX cycle;
- drx-SlotOffset: the delay before starting the drx-onDurationTimer;
- drx-InactivityTimer: the duration after the PDCCH occasion in which a PDCCH indicates a new UL or DL transmission for the MAC entity;
- drx-RetransmissionTimerDL (per DL HARQ process except for the broadcast process): the maximum duration until a DL retransmission is received;
- drx-RetransmissionTimerUL (per UL HARQ process): the maximum duration until a grant for UL retransmission is received;
- drx-LongCycleStartOffset: the Long DRX cycle and drx-StartOffset which defines the subframe where the Long and Short DRX cycle starts;
- drx-ShortCycle (optional): the Short DRX cycle;
- drx-ShortCycleTimer (optional): the duration the UE shall follow the Short DRX cycle;
- drx-HARQ-RTT-TimerDL (per DL HARQ process except for the broadcast process): the minimum duration before a DL assignment for HARQ retransmission is expected by the MAC entity;
- drx-HARQ-RTT-TimerUL (per UL HARQ process): the minimum duration before a UL HARQ retransmission grant is expected by the MAC entity;
- ps-Wakeup (optional): the configuration to start associated drx-onDurationTimer in case DCP is monitored but not detected;
- ps-TransmitOtherPeriodicCSI (optional): the configuration to report periodic CSI that is not L1-RSRP on PUCCH during the time duration indicated by drx-onDurationTimer in case DCP is configured but associated drx-onDurationTimer is not started;

TABLE 13-continued

- ps-TransmitPeriodicLI-RSRP (optional): the configuration to transmit periodic CSI that is L1-RSRP on PUCCH during the time duration indicated by drx-onDurationTimer in case DCP is configured but associated drx-onDurationTimer is not started.

Serving Cells of a MAC entity may be configured by RRC in two DRX groups with separate DRX parameters. When RRC does not configure a secondary DRX group, there is only one DRX group and all Serving Cells belong to that one DRX group. When two DRX groups are configured, each Serving Cell is uniquely assigned to either of the two groups. The DRX parameters that are separately configured for each DRX group are: drx-onDurationTimer, drx-InactivityTimer. The DRX parameters that are common to the DRX groups are: drx-SlotOffset, drx-RetransmissionTimerDL, drx-RetransmissionTimerUL, drx-LongCycleStartOffset, drx-ShortCycle (optional), drx-ShortCycleTimer (optional), drx-HARQ-RTT-TimerDL, and drx-HARQ-RTT-TimerUL.

When a DRX cycle is configured, the Active Time for Serving Cells in a DRX group includes the time while:

- drx-onDurationTimer or drx-InactivityTimer configured for the DRX group is running; or
- drx-RetransmissionTimerDL or drx-RetransmissionTimerUL is running on any Serving Cell in the DRX group;

TABLE 14 or

- ra-ContentionResolutionTimer (as described in clause 5.1.5) or msgB-ResponseWindow (as described in clause 5.1.4a) is running; or
- a Scheduling Request is sent on PUCCH and is pending (as described in clause 5.4.4); or
- a PDCCH indicating a new transmission addressed to the C-RNTI of the MAC entity has not been received after successful reception of a Random Access Response for the Random Access Preamble not selected by the MAC entity among the contention-based Random Access Preamble (as described in clauses 5.1.4 and 5.1.4a).

When DRX is configured, the MAC entity shall:

1> if a MAC PDU is received in a configured downlink assignment:
  2> start the drx-HARQ-RTT-TimerDL for the corresponding HARQ process in the first symbol after the end of the corresponding transmission carrying the DL HARQ feedback;
  2> stop the drx-RetransmissionTimerDL for the corresponding HARQ process.
1> if a MAC PDU is transmitted in a configured uplink grant and LBT failure indication is not received from lower layers:
  2> start the drx-HARQ-RTT-TimerUL for the corresponding HARQ process in the first symbol after the end of the first repetition of the corresponding PUSCH transmission;
  2> stop the drx-RetransmissionTimerUL for the corresponding HARQ process.
1> if a drx-HARQ-RTT-TimerDL expires:
  2> if the data of the corresponding HARQ process was not successfully decoded:
    3> start the drx-RetransmissionTimerDL for the corresponding HARQ process in the first symbol after the expiry of drx-HARQ-RTT-TimerDL.
1> if a drx-HARQ-RTT-TimerUL expires:
  2> start the drx-RetransmissionTimerUL for the corresponding HARQ process in the first symbol after the expiry of drx-HARQ-RTT-TimerUL.
1> if a DRX Command MAC CE or a Long DRX Command MAC CE is received:
  2> stop drx-onDurationTimer for each DRX group;
  2> stop drx-InactivityTimer for each DRX group.
1> if drx-InactivityTimer for a DRX group expires:
  2> if the Short DRX cycle is configured:
    3> start or restart drx-ShortCycleTimer for this DRX group in the first symbol after the expiry of drx-InactivityTimer;
    3> use the Short DRX cycle for this DRX group.
  2> else:
    3> use the Long DRX cycle for this DRX group.
1> if a DRX Command MAC CE is received:
  2> if the Short DRX cycle is configured:
    3> start or restart drx-ShortCycleTimer for each DRX group in the first symbol after the end of DRX Command MAC CE reception;

TABLE 15

3> use the Short DRX cycle for each DRX group.
  2> else:
    3> use the Long DRX cycle for each DRX group.
1> if drx-ShortCycleTimer for a DRX group expires:
  2> use the Long DRX cycle for this DRX group.
1> if a Long DRX Command MAC CE is received:
  2> stop drx-ShortCycleTimer for each DRX group;
  2> use the Long DRX cycle for each DRX group.

TABLE 15-continued

1> if the Short DRX cycle is used for a DRX group, and [(SFN × 10) + subframe number] modulo (drx-ShortCycle) = (drx-StartOffset) modulo (drx-ShortCycle):
  2> start drx-onDurationTimer for this DRX group after drx-SlotOffset from the beginning of the subframe.
1> if the Long DRX cycle is used for a DRX group, and [(SFN × 10) + subframe number] modulo (drx-LongCycle) = drx-StartOffset:
  2> if DCP monitoring is configured for the active DL BWP as specified in TS 38.213 [6], clause 10.3:
    3> if DCP indication associated with the current DRX cycle received from lower layer indicated to start drx-onDurationTimer, as specified in TS 38.213 [6]; or
    3> if all DCP occasion(s) in time domain, as specified in TS 38.213 [6], associated with the current DRX cycle occurred in Active Time considering grants/assignments/DRX Command MAC CE/Long DRX Command MAC CE received and Scheduling Request sent until 4 ms prior to start of the last DCP occasion, or within BWP switching interruption length, or during a measurement gap, or when the MAC entity monitors for a PDCCH transmission on the search space indicated by recoverySearchSpaceId of the SpCell identified by the C-RNTI while the ra-ResponseWindow is running (as specified in clause 5.1.4); or
    3> if ps-Wakeup is configured with value true and DCP indication associated with the current DRX cycle has not been received from lower layers:
      4> start drx-onDurationTimer after drx-SlotOffset from the beginning of the subframe.
  2> else:
    3> start drx-onDurationTimer for this DRX group after drx-SlotOffset from the beginning of the subframe.

NOTE 2: In case of unaligned SFN across carriers in a cell group, the SFN of the SpCell is used to calculate the DRX duration.

1> if a DRX group is in Active Time:
  2> monitor the PDCCH on the Serving Cells in this DRX group as specified in TS 38.213 [6];
  2> if the PDCCH indicates a DL transmission:
    3> start the drx-HARQ-RTT-TimerDL for the corresponding HARQ process in the first symbol after the end of the corresponding transmission carrying the DL HARQ feedback;

NOTE 3: When HARQ feedback is postponed by PDSCH-to-HARQ_feedback timing indicating a non-numerical k1 value, as specified in TS 38.213 [6], the corresponding transmission opportunity to send the DL HARQ feedback is indicated in a later PDCCH requesting the HARQ-ACK feedback.

3> stop the drx-RetransmissionTimerDL for the corresponding HARQ process.
    3> if the PDSCH-to-HARQ_feedback timing indicate a non-numerical k1 value as specified in TS 38.213 [6]:
      4> start the drx-RetransmissionTimerDL in the first symbol after the PDSCH transmission for the corresponding HARQ process.
  2> if the PDCCH indicates a UL transmission:

TABLE 16

3> start the drx-HARQ-RTT-TimerUL for the corresponding HARQ process in the first symbol after the end of the first repetition of the corresponding PUSCH transmission;
    3> stop the drx-RetransmissionTimerUL for the corresponding HARQ process.
  2> if the PDCCH indicates a new transmission (DL or UL) on a Serving Cell in this DRX group:
    3> start or restart drx-InactivityTimer for this DRX group in the first symbol after the end of the PDCCH reception.
  2> if a HARQ process receives downlink feedback information and acknowledgement is indicated:
    3> stop the drx-RetransmissionTimerUL for the corresponding HARQ process.
1> if DCP monitoring is configured for the active DL BWP as specified in TS 38.213 [6], clause 10.3; and
1> if the current symbol n occurs within drx-onDurationTimer duration; and
1> if drx-onDurationTimer associated with the current DRX cycle is not started as specified in this clause:
  2> if the MAC entity would not be in Active Time considering grants/assignments/DRX Command MAC CE/Long DRX Command MAC CE received and Scheduling Request sent until 4 ms prior to symbol n when evaluating all DRX Active Time conditions as specified in this clause:
    3> not transmit periodic SRS and semi-persistent SRS defined in TS 38.214 [7];
    3> not report semi-persistent CSI configured on PUSCH;
    3> if ps-TransmitPeriodicLI-RSRP is not configured with value true:
      4> not report periodic CSI that is L1-RSRP on PUCCH.
    3> if ps-TransmitOtherPeriodicCSI is not configured with value true:
      4> not report periodic CSI that is not L1-RSRP on PUCCH.
1> else:
  2> in current symbol n, if a DRX group would not be in Active Time considering grants/assignments scheduled on Serving Cell(s) in this DRX group and DRX Command MAC CE/Long DRX Command MAC CE received and Scheduling TABLE 16-continued Request sent until 4 ms prior to symbol n when evaluating all DRX Active Time conditions as specified in this clause:

3> not transmit periodic SRS and semi-persistent SRS defined in TS 38.214 [7] in this DRX group;

3> not report CSI on PUCCH and semi-persistent CSI configured on PUSCH in this DRX group.

2> if CSI masking (csi-Mask) is setup by upper layers:

3> in current symbol n, if drx-onDurationTimer of a DRX group would not be running considering grants/assignments scheduled on Serving Cell(s) in this DRX group and DRX Command MAC CE/Long DRX Command MAC CE received until 4 ms prior to symbol n when evaluating all DRX Active Time conditions as specified in this clause; and 4> not report CSI on PUCCH in this DRX group.

NOTE 4: If a UE multiplexes a CSI configured on PUCCH with other overlapping UCI(s) according to the procedure specified in TS 38.213 [6] clause 9.2.5 and this CSI multiplexed with other UCI(s) would be reported on a PUCCH resource outside DRX Active Time of the DRX group in which this PUCCH is configured, it is up to UE implementation whether to report this CSI multiplexed with other UCI(s).

Regardless of whether the MAC entity is monitoring PDCCH or not on the Serving Cells in a DRX group, the MAC entity transmits HARQ feedback, aperiodic CSI on PUSCH, and aperiodic SRS defined in TS 38.214 [7] on the Serving Cells in the DRX group when such is expected.

The MAC entity needs not to monitor the PDCCH if it is not a complete PDCCH occasion (e.g. the Active Time starts or ends in the middle of a PDCCH occasion).

Table 17 below shows a portion of the Rel-17 V2X WID (RP-201385).

TABLE 17

4.1 Objective of SI or Core part WI or Testing part WI

The objective of this work item is to specify radio solutions that can enhance NR sidelink for the V2X, public safety and commercial use cases.

1. Sidelink evaluation methodology update: Define evaluation assumption and performance metric for power saving by reusing TR 36.843 and/or TR 38.840 (to be completed by RAN#89) [RAN1]
   - Note: TR 37.885 is reused for the other evaluation assumption and performance metric. Vehicle dropping model B and antenna option 2 shall be a more realistic baseline for highway and urban grid scenarios.
2. Resource allocation enhancement:
   - Specify resource allocation to reduce power consumption of the UEs [RAN1, RAN2]
   - Baseline is to introduce the principle of Rel-14 LTE sidelink random resource selection and partial sensing to Rel-16 NR sidelink resource allocation mode 2.
   - Note: Taking Rel-14 as the baseline does not preclude introducing a new solution to reduce power consumption for the cases where the baseline cannot work properly.
   - Study the feasibility and benefit of the enhancement(s) in mode 2 for enhanced reliability and reduced latency in consideration of both PRR and PIR defined in TR37.885 (by RAN#91), and specify the identified solution if deemed feasible and beneficial [RAN1, RAN2]
   - Inter-UE coordination with the following until RAN#90.
   - A set of resources is determined at UE-A. This set is sent to UE-B in mode 2, and UE-B takes this into account in the resource selection for its own transmission.
   - Note: The study scope after RAN#90 is to be decided in RAN#90.
   - Note: The solution should be able to operate in-coverage, partial coverage, and out-of-coverage and to address consecutive packet loss in all coverage scenarios.
   - Note: RAN2 work will start after [RAN#89].
3. Sidelink DRX for broadcast, groupcast, and unicast [RAN2]
   - Define on- and off-durations in sidelink and specify the corresponding UE procedure
   - Specify mechanism aiming to align sidelink DRX wake-up time among the UEs communicating with each other
   - Specify mechanism aiming to align sidelink DRX wake-up time with Uu DRX wake-up time in an in-coverage UE
4. Support of new sidelink frequency bands for single-carrier operations [RAN4]
   - Support of new sidelink frequency bands should ensure coexistence between sidelink and Uu interface in the same and adjacent channels in licensed spectrum.
   - The exact frequency bands are to be determined based on company input during the WI, considering both licensed and ITS-dedicated spectrum in both FR1 and FR2.
5. Define mechanism to ensure sidelink operation can be confined to a predetermined geographic area(s) for a given frequency range within non-ITS bands [RAN2].
   - This applies areas where there is no network coverage.
6. UE Tx and Rx RF requirement for the new features introduced in this WI [RAN4]
7. UE RRM core requirement for the new features introduced in this WI [RAN4]

Figure 12:
FIG. 12 shows a UE and a peer UE.

FIG. 12 illustrates a relationship between a UE and a peer UE. In sidelink communication, one sidelink UE (UE in FIG. 12) may establish a PC5 RRC connection with another UE. In this case, the other UE that establishes a PC5 RRC connection corresponds to the peer UE. When a PC5 RRC connection is established, both the UE and the peer UE may transmit (TX) or receive (RX) sidelink signals to each other.

With regard to SL DRX, the contents of Table 18 below are discussed.

TABLE 18

| |
|---|
| [DRX_2]: When should TX UE and RX UE apply the SL-DRX configurations exchanged via RRCReconfigurationSL (e.g. when deciding acceptance @RX UE and when receiving acceptance indication @TX UE) |
| [DRX_4]: Whether the TX UE should keep in active time after sending RRCReconfigurationSL (not only for initial DRX config, but more generally for subsequent RRCReconfigurationSL transfer). |

The contents of Table 18 above are related to a method of applying a SL DRX configuration. In relation to the above description, the following embodiments of the present disclosure disclose contents related to a time of applying the SL DRX configuration.

Figure 13:
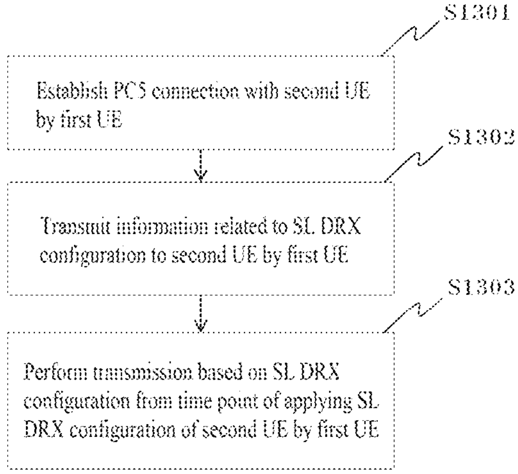
FIG. 13 is a diagram to explain an embodiment.

According to an embodiment, after a first UE establishes a PC5 connection with a second UE (S1301 of FIG. 13), the first UE may transmit SL DRX configuration related information to the second UE (S1302). The first UE may perform transmission based on the SL DRX configuration from the time point of applying the SL DRX configuration to the second UE (S1303).

The time point of applying the SL DRX configuration of the second UE may be a time point related to transmission of hybrid automatic repeat request acknowledgement (HARQ ACK) information for a physical sidelink shared channel (PSSCH) including the SL DRX configuration (or an ACK information transmission time).

The time point related to transmission of the HARQ ACK information may include a time at which the HARQ ACK information is transmitted or a time at which HARQ ACK information, transmission of which is omitted, is determined to be transmitted. Alternatively, the time point related to transmission of the HARQ ACK information may be a time point after a predetermined offset value from the time point at which the HARQ ACK information is transmitted. That is, the time point related to transmission of the HARQ ACK information may be the ACK information transmission time (based on a linked PSFCH resource) for a PSSCH including the SL DRX configuration (and/or a time point after a preset offset value from the ACK information transmission time (e.g., which may be interpreted as a PSFCH processing time)) (and/or a time point of a PSFCH resource linked to PSSCH including the SL DRX configuration and/or a time point after a preset offset value from a time point of a PSFCH resource).

Here, the HARQ ACK information, transmission of which is omitted, may be omitted based on priorities of the sidelink and uplink signals. Alternatively, the HARQ ACK information, transmission of which is omitted, may be omitted based on the priority related to PSFCH transmission and reception. That is, "ACK information transmission time" may be (limitedly) interpreted as a time when the RX UE actually transmits the PSFCH including the ACK information to the TX UE or (extensively) interpreted to include a time when the ACK information transmission is omitted due to SL-UL prioritization, PSFCH TX/TX (or TX/RX) prioritization, and the like.

As another example, the time point related to transmission of the HARQ ACK information may be the last (or next) PSSCH resource time point indicated by PSSCH related SCI including (successfully decoded) SL DRX configuration (or a time point when the SL DRX RTT timer expires) (and/or a time point when the PSSCH including the SL DRX configuration is successfully decoded).

Application of the above rule may be limited to a case in which the SL DRX configuration is transmitted in the form of HARQ feedback enabled MAC PDU (or a case in which PSSCH transmission including SL DRX configuration is performed on a resource pool in which a PSFCH is configured).

The examples of the time point related to transmission of the HARQ ACK information may each mean that all conditions are satisfied independently or as long as the examples do not conflict.

(Some or all of) the conditions described above or below may be interpreted as additionally applying after the RX UE determines to accept the SL DRX configuration received from the TX UE.

A default SL DRX configuration may be applied before the SL DRX configuration is applied. That is, before a time point when the SL DRX configuration is applied, the RX UE may use the previously applied SL DRX configuration. (e.g., when there is the previously applied SL DRX configuration configured by the TX UE) or the RX UE may use the previously configured default SL DRX configuration configured by the RX UE (or not perform the SL DRX operation (e.g., ALWAYS WAKE-UP mode)) (e.g., when there is no previously applied SL DRX configuration).

Information related to the SL DRX configuration may include at least a portion of the above contents disclosed in the related art of the SL DRX, including Tables 13 and 14 above.

Based on the above embodiment, a loss of transmission packets may be reduced during a sidelink discontinuous reception (SL DRX) operation between a TX UE and an RX UE. This is because, when the TX UE configures the SL DRX configuration to the RX UE, the TX UE and the RX UE need to be aligned at a time point at which the SL DRX configuration is applied to the RX UE to smoothly perform the SL DRX operation. In more detail, the time point at which the SL DRX configuration is applied may be configured to at least one of the ACK information transmission time (based on a linked PSFCH resource) for the PSSCH including the SL DRX configuration or the last (or next) PSSCH resource time point indicated by the SCI related to the PSSCH including the (successfully decoded) SL DRX configuration in SL DRX configured by the TX UE, and thus time points at which the TX UE and the RX UE apply the SL DRX configuration may be aligned, thereby preventing data loss.

In terms of a second UE receiving the SL DRX configuration from a first UE, the second UE may establish a PC5 connection with the first UE and receive SL DRX configuration related information from the first UE. The second UE may receive a packet of the first UE based on the SL DRX configuration from the time point of applying the SL DRX configuration. Here, the time point of applying the SL DRX configuration of the second UE may be a time point related to transmission of hybrid automatic repeat request acknowledgement (HARQ ACK) information for a physical sidelink shared channel (PSSCH) including the SL DRX configuration.

The first UE may include at least one processor, and at least one computer memory operatively connected to the at least one processor and configured to store instructions that when executed cause the at least one processor to perform operations including establishing a PC5 connection with the second UE, transmitting information related to an SL DRX configuration to the second UE, and performing transmission based on the SL DRX configuration from a time point of applying the SL DRX configuration of the second UE, and the time point of applying the SL DRX configuration of the second UE may be a time point related to transmission of hybrid automatic repeat request acknowledgement (HARQ ACK) for a physical sidelink shared channel (PSSCH) including the SL DRX configuration. The first UE may communicate with at least one of another UE, a UE related to an autonomous driving vehicle, a base station (BS), or a network.

Continuously, another example related to a time point at which the TX UE and the RX UE apply the SL DRX configuration is described.

The time point of applying the SL DRX configuration may be the ACK information transmission time (based on the linked PSFCH resource) for the PSSCH including the SL DRX configuration acceptance message (ACT_MSG) (and/or a time point after a preset offset value from the ACK information transmission time (e.g., which may be interpreted as a PSFCH processing time) (and/or a time point of the PSFCH resource linked to the PSSCH including the ACT_MSG and/or a time point after a preset offset value from the PSFCH resource time point).

For example, "ACK information transmission time" may be (limitedly) interpreted as a time when the TX UE actually transmits the PSFCH including the ACK information to the RX UE or (extensively) interpreted to include a time when the ACK information transmission is omitted due to SL-UL prioritization, PSFCH TX/TX (or TX/RX) prioritization, and the like. Application of the above rule may be limited to a case in which the ACT_MSG is transmitted in the form of HARQ feedback enabled MAC PDU (or a case in which PSSCH transmission including ACT_MSG is performed on the resource pool in which the PSFCH is configured).

The time point of applying the SL DRX configuration may be the last (or next) PSSCH resource time point indicated by the PSSCH related SCI including (successfully decoded) ACT_MSG (or the time point when the SL DRX RTT timer expires) (and/or a time point when the PSSCH containing ACT_MSG is successfully decoded).

For example, application of the above rule may be limited to a case in which the ACT_MSG is transmitted in the form of HARQ feedback disabled MAC PDU (or a case in which PSSCH transmission including ACT_MSG is performed on the resource pool in which the PSFCH is not configured).

The time point of applying the SL DRX configuration may be a time point of receiving ACK information (based on a linked PSFCH resource) for the PSSCH including the SL DRX configuration (and/or a time point after a preset offset value (e.g., which may be interpreted as the PSFCH processing time) from the time point of receiving the ACK information) (and/or a time point of PSFCH resources linked to the PSSCH including the SL DRX configuration and/or a time point after a preset offset value from the PSFCH resource time point).

The "ACK information reception time" may be (limitedly) interpreted as a time when the TX UE actually receives the PSFCH including the ACK information from the RX UE or (extensively) interpreted to include a time when feedback information reception is omitted due to SL-UL prioritization, PSFCH TX/RX (or RX/RX) prioritization, and the like.

For example, application of the above rule may be limited to a case in which the SL DRX configuration is transmitted in the form of HARQ feedback enabled MAC PDU (or a case in which PSSCH transmission including SL DRX configuration is performed on a resource pool in which a PSFCH is configured).

The time point of applying the SL DRX configuration may be the last time point of PSSCH transmission related to SL DRX configuration.

For example, application of the above rule may be limited to a case in which the SL DRX configuration is transmitted in the form of HARQ feedback disabled MAC PDU (or a case in which PSSCH transmission including SL DRX configuration is performed on a resource pool in which a PSFCH is not configured).

The TX UE may cause the pre-configured default SL DRX configuration to be applied (or the SL DRX operation not to be performed (e.g., always wake-up type)) (e.g., when the previously applied SL DRX configuration does not exist) or the previous SL DRX configuration to be applied (e.g., when the previously configured SL DRX configuration received from a peer UE exists) during a section in which (some or all) of the following conditions are satisfied after the (updated) SL DRX configuration is (re)transmitted to the RX UE. For example, the RX UE may be interpreted to transmit ACT_MSG (and/or SL DRX configuration reject message (RJT_MSG)) considering application of the SL DRX configuration of the TX UE.

The section may be a section until receiving the ACT_MSG from the RX UE (after receiving a preset threshold number of RJT_MSGs (and/or after receiving ACK information for the PSSCH including SL DRX configuration (and/or after a PSFCH resource time point for the PSSCH including the SL DRX configuration) and/or after a preset offset value) (and/or after transmitting ACK information for the PSSCH including the RJT_MSG (and/or after a PSFCH resource time point for the PSSCH including the RJT_MSG) and/or after a preset offset value), and/or a section until receiving the ACT_MSG from the RX UE.

For example, when the ACT_MSG is received from the RX UE and an ACK/NACK information is transmitted by the TX UE, but the corresponding information is missed in the RX UE (e.g., due to the transmission/reception prioritize rule of the RX UE), according to the above technology, a situation may occur in which the TX UE considers that a new SL DRX configuration is configured, but the RX UE may not be sure whether a new SL DRX configuration is configured (because the RX UE does not receive an ACK/NACK for the ACT_MSG transmitted by the RX UE). In this case, when the HARQ timer expires, the RX UE may transmit the ACT_MSG again. In this case, the ACT_MSG transmitted may need to be transmitted with the configuration applied to the default configuration for BC/GC.

In the above description, "HARQ ACK or ACK information" may be replaced with "HARQ NACK or NACK information" or "HARQ feedback information".

In the existing LTE, only SL broadcast (BC) exists, and an SL groupcast (GC) operation does not exist. In the case of BC, there is an L2ID that is mapped to the V2X service ID, and thus the L2 ID used in BC may be a static address set. That is, when the V2X service IDs used in a network are determined, a BS may also predetermine which L2 IDs are used.

However, unlike BC, in GC, L2 ID is generated dynamically. For example, during platooning, when UE #1, UE #2, and UE #3 generate a group and generate a platoon group ID=XXXX in an application layer, UEs belonging to the corresponding group execute a hashing function with XXXX to generate an L2 ID. When UE #4, UE #5, and UE #6 generate another platooning group and generate a platoon group ID=YYYY in the application layer, UEs belonging to the corresponding group executes a hashing function with YYYY to generate an L2 ID. That is, in the case of GC, the L2 ID is generated when an actual group is generated, and thus the BS may not previously know what value the L2 ID is generated for the GC.

In the case of the BC, the SL DRX configuration may be configured by a gNB for a DRX configuration related to a L2 ID, a QoS profile (one L2 ID may have multiple QoS profiles) and a TX profile. However, in the case of GC, the L2 ID is a value that is dynamically configured in the application layer of the UE, and thus the gNB may not know the L2 ID, and accordingly, may not know a mapping relationship between the L2 ID and the TX profile (e.g., release information and DRX on/off information), and QoS profile. The gNB needs to know this mapping information to allocate SL resources to the UE (e.g. in case of mode 1) or to align Uu DRX and SL DRX. This also applies to an operation in which a TX UE in GC performs GC transmission on UEs belonging to the group. Hereinafter, how the gNB knows the mapping relationship between the L2 ID and the TX profile (e.g., release information and DRX on/off information), and the QoS profile in case of GC is described. A method of processing data of services with different TX profiles but the same L2 ID when a TX UE performs GC transmission in GC is also described.

Figure 14:
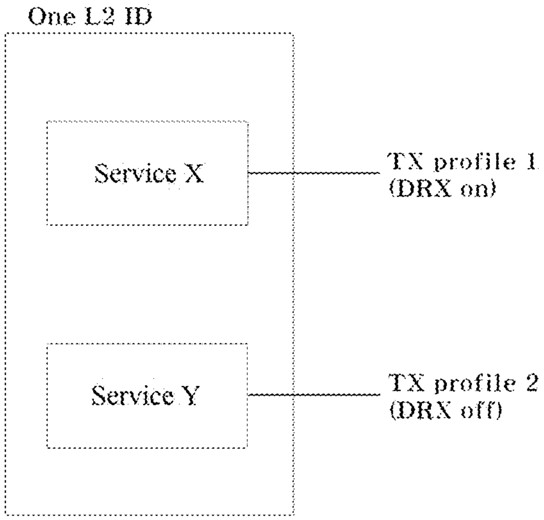
FIGS. 14 to 21 are diagrams to explain various devices to which the embodiment(s) are applicable.

The following embodiments may be based on that when a TX UE performs an LCP procedure, data exists on both service X related LCH and service Y related LCH as illustrated in FIG. 14, and the two service related L2 DST IDs (or L2 IDs) are the same, but service X data related TX profile (e.g., SL DRX support) and service Y data related TX profile (e.g., SL DRX not support) are different from each other. In this case, when LCH data related to service X and LCH data related to service Y are multiplexed, a UE belonging to a group receiving data of service X based on DRX on may not receive data of service Y transmitted based on DRX off in an off duration.

According to an embodiment, the first UE may generate an L2 ID for a predetermined group and transmit packets related to the L2 ID based on a plurality of TX profiles.

Here, in transmission of the packet, logical channels with different TX profiles may not be multiplexed. The TX profile may include information indicating whether sidelink DRX is supported, and at least some of the second UEs may be involved in groupcast reception.

That is, even if the L2 DST IDs are the same, a multiplexing operation is not performed between LCH data of different TX profiles. For example, when the corresponding rule is applied, it may be interpreted that only LCH data of the same TX profile as the TX profile related to LCH data of the highest priority is allowed for multiplexing. For example, when LCH data of different TX profiles have the same priority, LCH data having the TX profile of the SL DRX support (or the TX profile of the SL DRX not support) may be configured to be regarded as having a relatively higher priority and perform an LCP procedure. This may be interpreted as a form in which the TX UE does not exceptionally follow (for service X data) even though the BS signals the TX profile of the SL DRX support for L2 DST ID. The embodiment may be configured to be applied only when the TX UE reports both the L2 DST ID and two pieces of TX profile information to the BS (or reports the L2 DST ID and TX profile information of a specific value preconfigured (from the BS)). Here, for example, this form of information reporting may be interpreted as the TX UE (implicitly) informing the BS of a problem situation the TX UE faces.

As another example, a multiplexing operation may be applied between LCH data of different TX profiles, but the TX profile of the SL DRX support (or the SL DRX not support) may be followed, or (targeting such a situation) the preconfigured default SL DRX configuration/pattern may also be applied.

As another example, the BS may be instructed to report both L2 DST ID and the two pieces of TX profile information (or report only TX profile information of the L2 DST ID and the SL DRX not support (or SL DRX support) or report the L2 DST ID and the TX profile information (e.g., which may be interpreted as a kind of default TX profile information) of a specific value preconfigured (from the BS)). For example, the BS receiving both L2 DST ID and two pieces of TX profile information from the TX UE (or receiving L2 DST ID and TX profile information with a specific value pre-configured (from the BS)) may signal (for the L2 DST ID) default SL DRX configuration/pattern (or SL DRX not support (or SL DRX support) profile information that applies to this situation).

As another example, the TX UE may transmit the TX profile information related to L2 DST ID received from the BS to the RX UE through pre-configured signaling. Here, for example, when the corresponding rule is applied, the RX UE may interpret that the RX UE follows the information received from the TX UE rather than following the TX profile information related to the L2 DST ID received from an upper layer of the RX UE (e.g., V2X layer). For example, the TX UE may additionally inform the RX UE to apply the default SL DRX configuration/pattern (received from the BS or derived based on a predefined rule of the TX UE) through pre-configured signaling.

As another example, when a RX UE is interested in both service X (e.g., TX profile of SL DRX not support) and service Y (e.g., TX profile of SL DRX not support) and receives different TX profile information for the same L2 DST ID from an upper layer of the RX UE (e.g., V2X layer), the RX UE may follow the TX profile of the SL DRX support (or SL DRX not support), or apply the default SL DRX configuration/pattern that is pre-configured (targeting this situation). For example, the RX UE may be instructed to report both L2 DST ID and the two pieces of TX profile information (or report only TX profile information of the L2 DST ID and the SL DRX not support (or SL DRX support) or report the L2 DST ID and the TX profile information of a specific value preconfigured (from the BS)) to a serving cell of the RX UE.

As another example, selection of L2 IDs related to GC may be restricted based on the configuration between the L2 ID specified by NW and the TX profile (and/or QoS profile). For example, the AS layer of the UE may report the configuration information provided by the NW to a higher layer (e.g., application layer and V2X layer), and the higher layer may use the configuration information to select a GC related L2 ID and configure the linked TX profile (and/or QoS profile). (This may only apply to UEs in an idle/inactive state.)

As another example, in case of a UE in an idle/inactive state, when the NW does not provide the configuration for mapping between the L2 ID and the TX profile related to the service the UE is interested in, the UE may be prevented from performing an SL DRX operation. In this case, the UE may return to the RRC_CONECTED state and report UE assistance information (mapping information between the L2 ID and TX profile (and/or QoS profile) related to the service the UE is interested in, received from the higher layer of the UE) to the BS, which may be one of conditions for initiating UAI information reporting. Alternatively, only the default DRX configuration may be used (which may be limited to using default or always wakeup only until the UE reports UAI information to the BS and receives related mapping information). When the default DRX configuration is applied, the (DST) ID (on the SCI or MAC subheader) may be set to a pre-configured value. For example, each service may have its own ID preconfigured. In this case, the ID may be an L2 layer ID, but may also be an application ID. Alternatively, the UE may implementally choose between not performing an SL DRX operation or receiving SL DRX patterns based on UAI reports.

As another example, in the case of a connected state, UAI information may be reported, and likewise, default may be used or always wake-up may be used until relevant information is received from the NW. Even in the connected state, the gNB does not know the L2 ID, TX profile, and QoS profile information associated with the service of the TX UE, and thus the TX UE needs to report the information to the gNB. When the default is used, the TX UE informs the other party UE that the default is to be used until the SL DRX pattern is actually received and applied.

As another example, in the case of GC/BC, the same DST ID may be generated for different services at the higher layer. That is, a situation in which DST ID=a (TX profile DRX on) may occur for service A and DST ID=a (but, TX profile DRX off) may also occur for service B. In this case, the TX UE may report the QoS profile, TX profile, and DST ID for each service to the gNB, and in this case, the gNB may determine not to apply DRX for the corresponding DST ID (always-on and gNB implementation) and may not report any value for the corresponding DRX profile. An RX UE receiving a GC message may implicitly interpret a DRX configuration related to the (received) DST ID of a specific service as always on and not apply SL DRX when the RX UE does not receive the DRX configuration from the gNB (even if TX profile DRX is on).

The TX (and/or RX) UE may report the DST ID and TX profile information assigned by the higher layers to the gNB via SUI. When the TX PROFILE information changes, the information may be used as a condition to initiate SUI reporting. For example, for the same DST ID, the TX profile information is reported as SL DRX on in the previous SUI report, but when the TX profile information for the same DST ID is changed to SL DRX off, it may be necessary to report again through SUI. The proposed method/rule may be extended to a case in which the BS receives different TX profile information for the same L2 DST ID from TX UE 1 with LCH data related to service X and TX UE 2 with LCH data related to service Y. The proposed method/rule may be applied only to groupcast (and/or broadcast). The proposed method/rule may also be applied when the RX UE reports L2 DST and QoS profile (and/or TX profile) to a serving BS of the RX UE when the RX UE is interested in a specific GC related service.

As another example, there is a possibility that SDUs of DRX-based TX profile and SDUs of non-DRX based TX profile are generated for the same destination ID (regardless of cast type (or) limited to GC/BC). In this case, there is also a need for discussion on which TX profile to apply when multiplexing two SDUs. For example, when SDUs of a DRX-based TX profile and SDUs of a non-DRX based TX profile are generated for the same destination ID, the operation may be restricted such that MUX is not performed for these SDUs even if the SDUs are for the same destination.

Alternatively, multiplexing may be performed, but the DRX-based TX profile may be followed. This may achieve a power saving gain, and in the case of GC/BC, not only RX UEs with DRX enabled but also RX UEs with DRX disabled ("always-on") may receive multiplexed packets.

Alternatively, multiplexing may be performed, but the non-DRX-based TX profile ("always on") may followed. To this end, (all) RX UEs need to know this situation, otherwise, RX UEs performing reception with DRX-based may lose received packets. In the case of GC/BC, even the RX UE that intends to receive only service-related packets corresponding to the DRX-based TX profile needs to always be on to receive packets, which has a disadvantage of making it difficult to obtain power saving gain.

As another example, in a BC/GC operation, when the UE implicitly/explicitly reports to the gNB that different TX profile {DRX on or DRX off} are assigned for the same DST ID, the Model UE may perform mode transit to the Mode2 UE. Alternatively, the gNB may configure mode transit to the UE. It may be unreasonable for the gNB to handle different TX profiles for the same DST ID, and thus a transition to mode2 may be induced.

The TX profile may be DRX off and the QoS profile may be (pre-)configured to apply default GC/BC when non-existent packets are transmitted from the higher layer.

Through the embodiments described above, the BS may know a mapping relationship between the L2 ID and the TX profile (and/or the QoS profile) and the SL DRX configuration when the SL DRX GC is operated, which may be helpful for SL resource setting and SL DRX and Uu DRX alignment.

In relation to the above description, SidelinkUEInformationNR message, UEAssistanceInformation message, and the like in 3GPP TS 38.331 document are used as the related art in the embodiment. For example, this may be sl-DestinationIdentity indicating a destination for TX resource request and allocation, sl-QoS-InfoList including the QoS profile of the sidelink QoS flow, and QoS-FlowIdentity identifying the sidelink QoS flow between the UE and the network.

Examples of Communication Systems Applicable to the Present Disclosure

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 15:
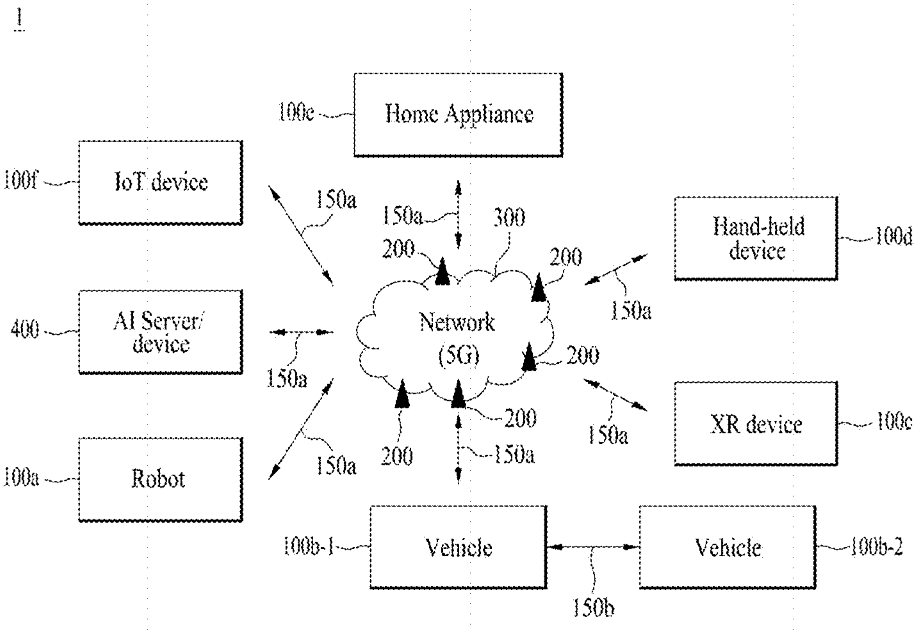

FIG. 15 illustrates a communication system 1 applied to the present disclosure.

Referring to FIG. 15, a communication system 1 applied to the present disclosure includes wireless devices, BSs, and a network. Herein, the wireless devices represent devices performing communication using RAT (e.g., 5G NR or LTE) and may be referred to as communication/radio/5G devices. The wireless devices may include, without being limited to, a robot 100*a*, vehicles 100*b*-1 and 100*b*-2, an extended reality (XR) device 100*c*, a hand-held device 100*d*, a home appliance 100*e*, an Internet of things (IoT) device 100*f*, and an artificial intelligence (AI) device/server 400. For example, the vehicles may include a vehicle having a wireless communication function, an autonomous driving vehicle, and a vehicle capable of performing communication between vehicles. Herein, the vehicles may include an unmanned aerial vehicle (UAV) (e.g., a drone). The XR device may include an augmented reality (AR)/virtual reality (VR)/mixed reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200*a* may operate as a BS/network node with respect to other wireless devices.

The wireless devices 100*a* to 100*f* may be connected to the network 300 via the BSs 200. An AI technology may be applied to the wireless devices 100*a* to 100*f* and the wireless devices 100*a* to 100*f* may be connected to the AI server 400 via the network 300. The network 300 may be configured using a 3G network, a 4G (e.g., LTE) network, or a 5G (e.g., NR) network. Although the wireless devices 100*a* to 100*f* may communicate with each other through the BSs 200/network 300, the wireless devices 100*a* to 100*f* may perform direct communication (e.g., sidelink communication) with each other without passing through the BSs/network. For example, the vehicles 100*b*-1 and 100*b*-2 may perform direct communication (e.g. V2V/V2X communication). The IoT device (e.g., a sensor) may perform direct communication with other IoT devices (e.g., sensors) or other wireless devices 100*a* to 100*f*.

Wireless communication/connections 150*a*, 150*b*, or 150*c* may be established between the wireless devices 100*a* to 100*f*/BS 200, or BS 200/BS 200. Herein, the wireless communication/connections may be established through various RATs (e.g., 5G NR) such as UL/DL communication 150*a*, sidelink communication 150*b* (or, D2D communication), or inter BS communication (e.g. relay, integrated access backhaul (IAB)). The wireless devices and the BSs/the wireless devices may transmit/receive radio signals to/from each other through the wireless communication/connections 150*a* and 150*b*. For example, the wireless communication/connections 150*a* and 150*b* may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Examples of Wireless Devices Applicable to the Present Disclosure

Figure 16:
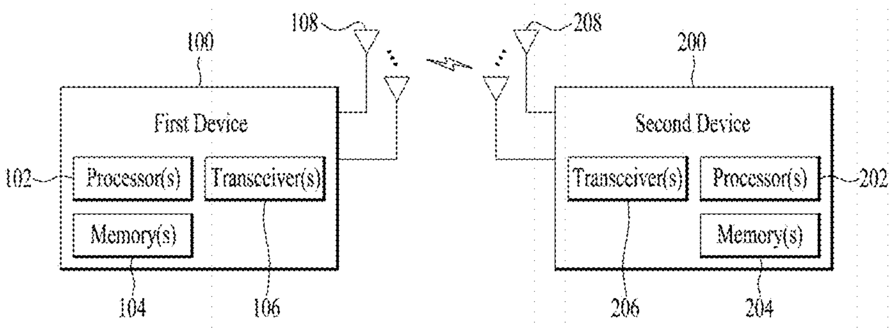

FIG. 16 illustrates wireless devices applicable to the present disclosure.

Referring to FIG. 16, a first wireless device 100 and a second wireless device 200 may transmit radio signals through a variety of RATs (e.g., LTE and NR). Herein, {the first wireless device 100 and the second wireless device 200} may correspond to {the wireless device 100*x* and the BS 200} and/or {the wireless device 100*x* and the wireless device 100*x*} of FIG. 15.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more service data unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 17:
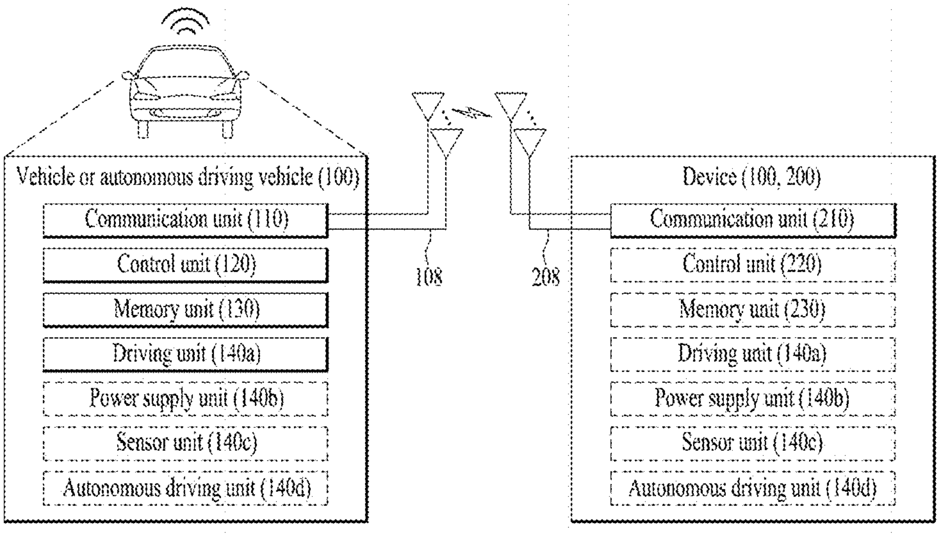

Examples of a Vehicle or an Autonomous Driving Vehicle Applicable to the Present Disclosure FIG. 17 illustrates a vehicle or an autonomous driving vehicle applied to the present disclosure. The vehicle or autonomous driving vehicle may be implemented by a mobile robot, a car, a train, a manned/unmanned aerial vehicle (AV), a ship, etc.

Referring to FIG. 17, a vehicle or autonomous driving vehicle 100 may include an antenna unit 108, a communication unit 110, a control unit 120, a driving unit 140*a*, a power supply unit 140*b*, a sensor unit 140*c*, and an autonomous driving unit 140*d*. The antenna unit 108 may be configured as a part of the communication unit 110.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an ECU. The driving unit 140*a* may cause the vehicle or the autonomous driving vehicle 100 to drive on a road. The driving unit 140*a* may include an engine, a motor, a powertrain, a wheel, a brake, a steering device, etc. The power supply unit 140*b* may supply power to the vehicle or the autonomous driving vehicle 100 and include a wired/wireless charging circuit, a battery, etc. The sensor unit 140*c* may acquire a vehicle state, ambient environment information, user information, etc. The sensor unit 140*c* may include an inertial measurement unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140*d* may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140*d* may generate an autonomous driving path and a driving plan from the obtained data. The control unit 120 may control the driving unit 140*a* such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140*c* may obtain a vehicle state and/or surrounding environment information. The autonomous driving unit 140*d* may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

Examples of a Vehicle and AR/VR Applicable to the Present Disclosure

Figure 18:
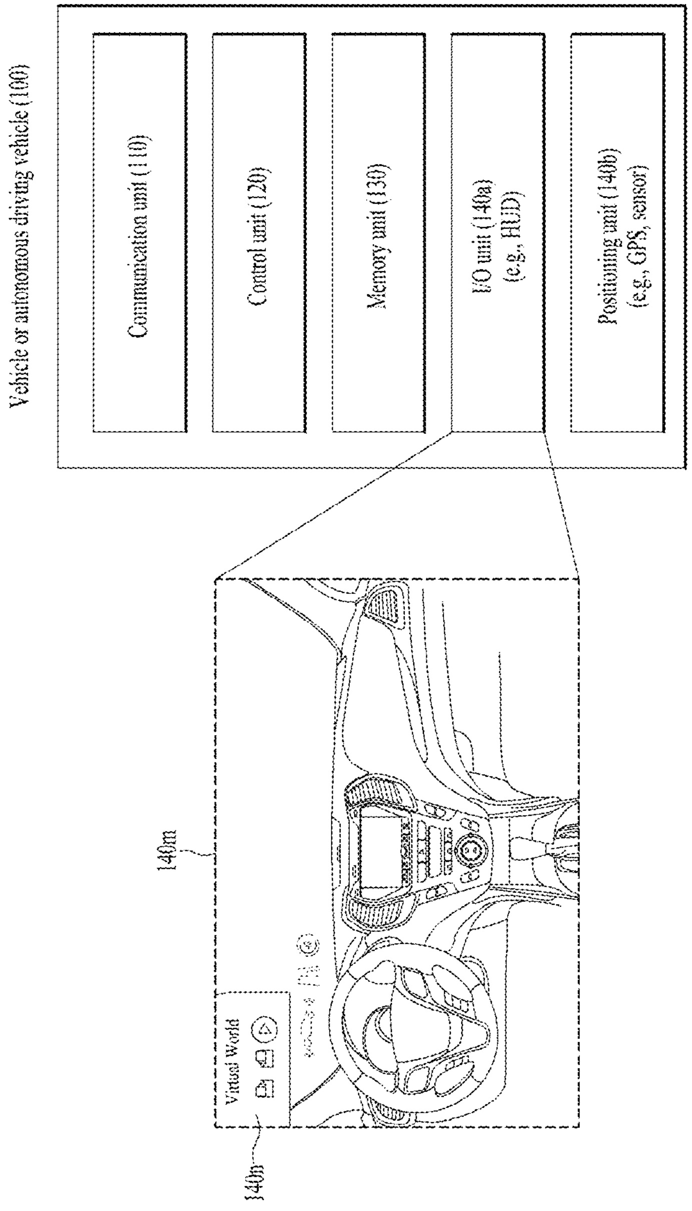

FIG. 18 illustrates a vehicle applied to the present disclosure. The vehicle may be implemented as a transport means, an aerial vehicle, a ship, etc.

Referring to FIG. 18, a vehicle 100 may include a communication unit 110, a control unit 120, a memory unit 130, an I/O unit 140*a*, and a positioning unit 140*b*.

The communication unit 110 may transmit and receive signals (e.g., data and control signals) to and from external devices such as other vehicles or BSs. The control unit 120 may perform various operations by controlling constituent elements of the vehicle 100. The memory unit 130 may store data/parameters/programs/code/commands for supporting various functions of the vehicle 100. The I/O unit 140*a* may output an AR/VR object based on information within the memory unit 130. The I/O unit 140*a* may include an HUD. The positioning unit 140*b* may acquire information about the position of the vehicle 100. The position information may include information about an absolute position of the vehicle 100, information about the position of the vehicle 100 within a traveling lane, acceleration information, and information about the position of the vehicle 100 from a neighboring vehicle. The positioning unit 140*b* may include a GPS and various sensors.

As an example, the communication unit 110 of the vehicle 100 may receive map information and traffic information from an external server and store the received information in the memory unit 130. The positioning unit 140*b* may obtain the vehicle position information through the GPS and various sensors and store the obtained information in the memory unit 130. The control unit 120 may generate a virtual object based on the map information, traffic information, and vehicle position information and the I/O unit 140*a* may display the generated virtual object in a window in the vehicle (1410 and 1420). The control unit 120 may determine whether the vehicle 100 normally drives within a traveling lane, based on the vehicle position information. If the vehicle 100 abnormally exits from the traveling lane, the control unit 120 may display a warning on the window in the vehicle through the I/O unit 140*a*. In addition, the control unit 120 may broadcast a warning message regarding driving abnormity to neighboring vehicles through the communication unit 110. According to situation, the control unit 120 may transmit the vehicle position information and the information about driving/vehicle abnormality to related organizations.

Examples of an XR Device Applicable to the Present Disclosure

Figure 19:
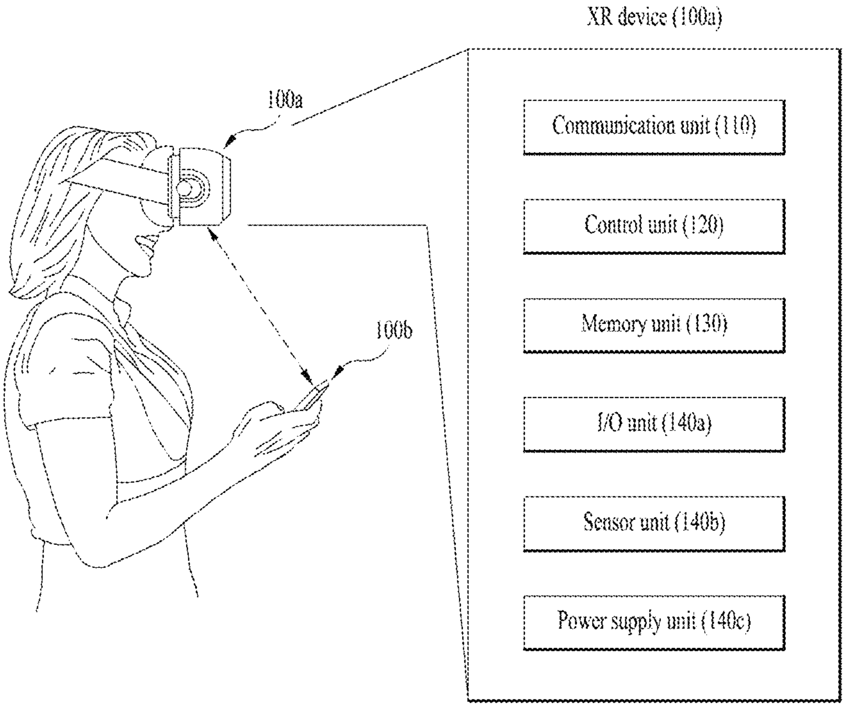

FIG. 19 illustrates an XR device applied to the present disclosure. The XR device may be implemented by an HMD, an HUD mounted in a vehicle, a television, a smartphone, a computer, a wearable device, a home appliance, a digital signage, a vehicle, a robot, etc.

Referring to FIG. 19, an XR device 100*a* may include a communication unit 110, a control unit 120, a memory unit 130, an I/O unit 140*a*, a sensor unit 140*b*, and a power supply unit 140*c*.

The communication unit 110 may transmit and receive signals (e.g., media data and control signals) to and from external devices such as other wireless devices, hand-held devices, or media servers. The media data may include video, images, and sound. The control unit 120 may perform various operations by controlling constituent elements of the XR device 100*a*. For example, the control unit 120 may be configured to control and/or perform procedures such as video/image acquisition, (video/image) encoding, and metadata generation and processing. The memory unit 130 may store data/parameters/programs/code/commands needed to drive the XR device 100*a*/generate XR object. The I/O unit 140*a* may obtain control information and data from the exterior and output the generated XR object. The I/O unit 140*a* may include a camera, a microphone, a user input unit, a display unit, a speaker, and/or a haptic module. The sensor unit 140*b* may obtain an XR device state, surrounding environment information, user information, etc. The sensor unit 140*b* may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, a light sensor, a microphone and/or a radar. The power supply unit 140*c* may supply power to the XR device 100*a* and include a wired/wireless charging circuit, a battery, etc.

For example, the memory unit 130 of the XR device 100*a* may include information (e.g., data) needed to generate the XR object (e.g., an AR/VR/MR object). The I/O unit 140*a* may receive a command for manipulating the XR device 100*a* from a user and the control unit 120 may drive the XR device 100*a* according to a driving command of a user. For example, when a user desires to watch a film or news through the XR device 100*a*, the control unit 120 transmits content request information to another device (e.g., a hand-held device 100*b*) or a media server through the communication unit 130. The communication unit 130 may download/stream content such as films or news from another device (e.g., the hand-held device 100*b*) or the media server to the memory unit 130. The control unit 120 may control and/or perform procedures such as video/image acquisition, (video/image) encoding, and metadata generation/processing with respect to the content and generate/output the XR object based on information about a surrounding space or a real object obtained through the I/O unit 140*a*/sensor unit 140*b*.

The XR device 100*a* may be wirelessly connected to the hand-held device 100*b* through the communication unit 110 and the operation of the XR device 100*a* may be controlled by the hand-held device 100*b*. For example, the hand-held device 100*b* may operate as a controller of the XR device 100*a*. To this end, the XR device 100*a* may obtain information about a 3D position of the hand-held device 100*b* and generate and output an XR object corresponding to the hand-held device 100*b*.

Examples of a Robot Applicable to the Present Disclosure

Figure 20:
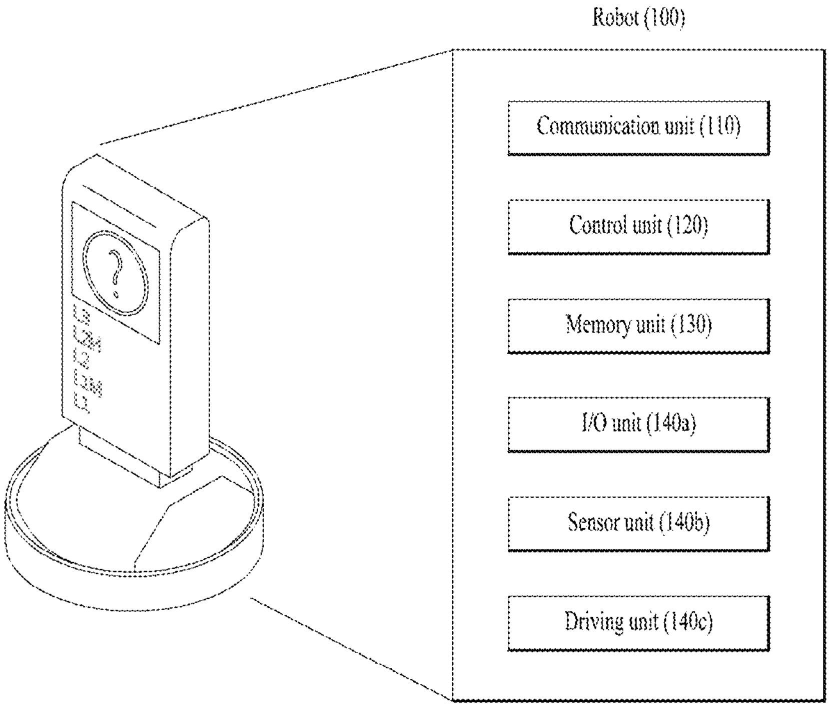

FIG. 20 illustrates a robot applied to the present disclosure. The robot may be categorized into an industrial robot, a medical robot, a household robot, a military robot, etc., according to a used purpose or field.

Referring to FIG. 20, a robot 100 may include a communication unit 110, a control unit 120, a memory unit 130, an I/O unit 140*a*, a sensor unit 140*b*, and a driving unit 140*c*. Herein, the blocks 110 to 130/140*a* to 140*c* correspond to the blocks 110 to 130/140 of FIG. 16, respectively.

The communication unit 110 may transmit and receive signals (e.g., driving information and control signals) to and from external devices such as other wireless devices, other robots, or control servers. The control unit 120 may perform various operations by controlling constituent elements of the robot 100. The memory unit 130 may store data/parameters/programs/code/commands for supporting various functions of the robot 100. The I/O unit 140*a* may obtain information from the exterior of the robot 100 and output information to the exterior of the robot 100. The I/O unit 140*a* may include a camera, a microphone, a user input unit, a display unit, a speaker, and/or a haptic module. The sensor unit 140*b* may obtain internal information of the robot 100, surrounding environment information, user information, etc. The sensor unit 140*b* may include a proximity sensor, an illumination sensor, an acceleration sensor, a magnetic sensor, a gyro sensor, an inertial sensor, an IR sensor, a fingerprint recognition sensor, an ultrasonic sensor, a light sensor, a microphone, a radar, etc. The driving unit 140*c* may perform various physical operations such as movement of robot joints. In addition, the driving unit 140*c* may cause the robot 100 to travel on the road or to fly. The driving unit 140*c* may include an actuator, a motor, a wheel, a brake, a propeller, etc.

Example of AI device to which the present disclosure is applied.

Figure 21:
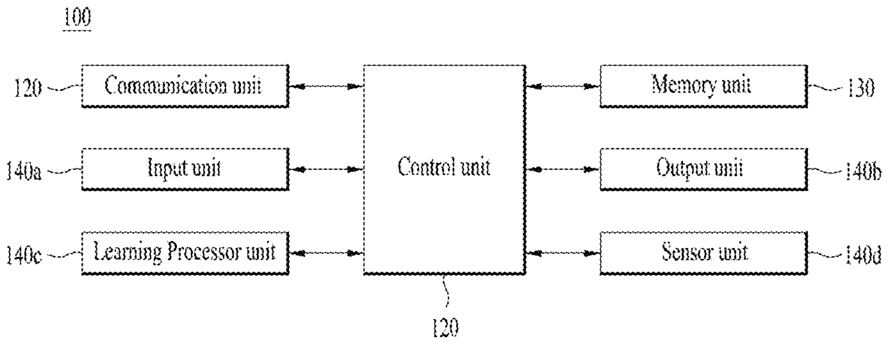

FIG. 21 illustrates an AI device applied to the present disclosure. The AI device may be implemented by a fixed device or a mobile device, such as a TV, a projector, a smartphone, a PC, a notebook, a digital broadcast terminal, a tablet PC, a wearable device, a Set Top Box (STB), a radio, a washing machine, a refrigerator, a digital signage, a robot, a vehicle, etc.

Referring to FIG. 21, an AI device 100 may include a communication unit 110, a control unit 120, a memory unit 130, an I/O unit 140*a*/140*b*, a learning processor unit 140*c*, and a sensor unit 140*d*. The blocks 110 to 130/140*a* to 140*d* correspond to blocks 110 to 130/140 of FIG. 16, respectively.

The communication unit 110 may transmit and receive wired/radio signals (e.g., sensor information, user input, learning models, or control signals) to and from external devices such as other AI devices (e.g., 100*x*, 200, or 400 of FIG. 15) or an AI server (e.g., 400 of FIG. 15) using wired/wireless communication technology. To this end, the communication unit 110 may transmit information within the memory unit 130 to an external device and transmit a signal received from the external device to the memory unit 130.

The control unit 120 may determine at least one feasible operation of the AI device 100, based on information which is determined or generated using a data analysis algorithm or a machine learning algorithm. The control unit 120 may perform an operation determined by controlling constituent elements of the AI device 100. For example, the control unit 120 may request, search, receive, or use data of the learning processor unit 140*c* or the memory unit 130 and control the constituent elements of the AI device 100 to perform a predicted operation or an operation determined to be preferred among at least one feasible operation. The control unit 120 may collect history information including the operation contents of the AI device 100 and operation feedback by a user and store the collected information in the memory unit 130 or the learning processor unit 140*c* or transmit the collected information to an external device such as an AI server (400 of FIG. 15). The collected history information may be used to update a learning model.

The memory unit 130 may store data for supporting various functions of the AI device 100. For example, the memory unit 130 may store data obtained from the input unit 140*a*, data obtained from the communication unit 110, output data of the learning processor unit 140*c*, and data obtained from the sensor unit 140. The memory unit 130 may store control information and/or software code needed to operate/drive the control unit 120.

The input unit 140*a* may acquire various types of data from the exterior of the AI device 100. For example, the input unit 140*a* may acquire learning data for model learning, and input data to which the learning model is to be applied. The input unit 140*a* may include a camera, a microphone, and/or a user input unit. The output unit 140*b* may generate output related to a visual, auditory, or tactile sense. The output unit 140*b* may include a display unit, a speaker, and/or a haptic module. The sensing unit 140 may obtain at least one of internal information of the AI device 100, surrounding environment information of the AI device 100, and user information, using various sensors. The sensor unit 140 may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, a light sensor, a microphone, and/or a radar.

The learning processor unit 140*c* may learn a model consisting of artificial neural networks, using learning data. The learning processor unit 140*c* may perform AI processing together with the learning processor unit of the AI server (400 of FIG. 15). The learning processor unit 140*c* may process information received from an external device through the communication unit 110 and/or information stored in the memory unit 130. In addition, an output value of the learning processor unit 140*c* may be transmitted to the external device through the communication unit 110 and may be stored in the memory unit 130.

INDUSTRIAL AVAILABILITY

The above-described embodiments of the present disclosure are applicable to various mobile communication systems.

The invention claimed is:

1. An operating method of a first user equipment (UE) related to sidelink discontinuous reception (SL DRX) in a wireless communication system, the method comprising:

establishing, by the first UE, a PC5 connection with a second UE;

transmitting, by the first UE, information related to an SL DRX configuration to the second UE; and performing, by the first UE, transmission based on the SL DRX configuration from a time point of applying the SL DRX configuration of the second UE, wherein the time point of applying the SL DRX configuration of the second UE is a time point related to transmission of hybrid automatic repeat request acknowledgement (HARQ ACK) information for a physical sidelink shared channel (PSSCH) including the SL DRX configuration.

2. The method of claim 1, wherein the time point related to transmission of the HARQ ACK information includes a time at which the HARQ ACK information is transmitted or a time at which HARQ ACK information, transmission of which is omitted, is determined to be transmitted.

3. The method of claim 2, wherein the HARQ ACK information, transmission of which is omitted, is omitted based on priorities of sidelink and uplink signals.

4. The method of claim 2, wherein the HARQ ACK information, transmission of which is omitted, is omitted based on a priority related to PSFCH transmission and reception.

5. The method of claim 1, wherein the time point related to transmission of the HARQ ACK information is a time point after a predetermined offset value from the time point at which the HARQ ACK information is transmitted.

6. The method of claim 1, wherein a default SL DRX configuration is applied before the time point of applying the SL DRX configuration.

7. An operating method of a second user equipment (UE) related to sidelink discontinuous reception (SL DRX) in a wireless communication system, the method comprising:

establishing a PC5 connection with a first UE by the second UE;

receiving information related to an SL DRX configuration from the first UE by the second UE; and receiving a packet of the first UE based on the SL DRX configuration from a time point of applying the SL DRX configuration by the second UE, wherein the time point of applying the SL DRX configuration of the second UE is a time point related to transmission of hybrid automatic repeat request acknowledgement (HARQ ACK) information for a physical sidelink shared channel (PSSCH) including the SL DRX configuration.

8. The method of claim 6, wherein the time point related to transmission of the HARQ ACK information includes a time at which the HARQ ACK information is transmitted or a time at which HARQ ACK information, transmission of which is omitted, is determined to be transmitted.

9. The method of claim 7, wherein the HARQ ACK information, transmission of which is omitted, is omitted based on priorities of sidelink and uplink signals.

10. The method of claim 7, wherein the HARQ ACK information, transmission of which is omitted, is omitted based on a priority related to PSFCH transmission and reception.

11. The method of claim 7, wherein the time point related to transmission of the HARQ ACK information is a time point after a predetermined offset value from the time point at which the HARQ ACK information is transmitted.

12. The method of claim 7, wherein a default SL DRX configuration is applied before the time point of applying the SL DRX configuration.

13. A first user equipment (UE) in a wireless communication system, the first UE comprising:

at least one processor; and at least one computer memory operatively connected to the at least one processor and configured to store instructions that when executed cause the at least one processor to perform operations, wherein the operations include:

establishing a PC5 connection with a second UE;

transmitting information related to an SL DRX configuration to the second UE; and performing transmission based on the SL DRX configuration from a time point of applying the SL DRX configuration of the second UE, and the time point of applying the SL DRX configuration of the second UE is a time point related to transmission of hybrid automatic repeat request acknowledgement (HARQ ACK) information for a physical sidelink shared channel (PSSCH) including the SL DRX configuration.

14. The first UE of claim 13, wherein the first UE communicates with at least one of another UE, a UE related to an autonomous driving vehicle, a base station (BS), or a network.

* * * * *